(12) United States Patent
Brcich et al.

(10) Patent No.: US 6,304,911 B1
(45) Date of Patent: Oct. 16, 2001

(54) INFORMATION PACKET RECEPTION INDICATOR FOR REDUCING THE UTILIZATION OF A HOST SYSTEM PROCESSOR UNIT

(75) Inventors: Joseph A. Brcich, San Jose; David G. Roberts, Fremont; Robert Williams, Cupertino, all of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 08/882,604

(22) Filed: Jun. 25, 1997

(51) Int. Cl.[7] ................................... G06F 15/16

(52) U.S. Cl. ................ 709/237; 709/224; 370/468; 370/504; 370/516; 710/261; 710/269

(58) Field of Search ................... 709/237, 238, 709/224; 370/468, 504, 516; 710/260, 261, 269

(56) References Cited

U.S. PATENT DOCUMENTS

| | | | |
|---|---|---|---|
| 4,771,391 | * | 9/1988 | Blasbalg .................. 364/514 |
| 5,018,138 | * | 5/1991 | Twitty et al. . |
| 5,193,151 | * | 3/1993 | Jain ........................ 395/200 |
| 5,263,054 | * | 11/1993 | Davis et al. ............... 375/94 |
| 5,307,350 | * | 4/1994 | McIntyre ................. 370/85.3 |
| 5,307,459 | * | 4/1994 | Peterson et al. .......... 395/200 |
| 5,384,770 | * | 1/1995 | Mays et al. .............. 370/43 |
| 5,412,782 | * | 5/1995 | Hausman et al. ......... 395/250 |
| 5,568,483 | * | 10/1996 | Padovani et al. ......... 370/84 |
| 5,572,678 | * | 11/1996 | Homma et al. ........... 395/200.12 |
| 5,634,006 | * | 5/1997 | Baugher et al. .......... 395/200.06 |
| 5,642,360 | * | 6/1997 | Tranin .................... 370/230 |
| 5,717,861 | * | 2/1998 | Rabii ...................... 395/200.13 |

(List continued on next page.)

OTHER PUBLICATIONS

*3C509 and 3C509–TP Adapters Technical Reference Guide*, 3COM Manual Part No. 8369–00, Mar. 1992.
*DECchip 21040 Ethernet Lan Controller for PCI Hardware Reference Manual.*
*SMC91C100 Advanced Information*, by Standard Microsystems Corporation, Apr. 26, 1994.
*FasterNet 100/10 Mb/s Ethernet LAN Controller for PCI*, Digital Equipment Corporation, Jun. 1994.

(List continued on next page.)

Primary Examiner—Robert B. Harrell
Assistant Examiner—Steve Willett

(57) ABSTRACT

A reception indicator circuit is provided for use in an apparatus, wherein the apparatus enables a host system to receive information packets from a medium. The reception indicator circuit has a delay calculator, a byte count comparator and a signal asserter. The delay calculator selects and reads a reference delay value in one of N number of length-delay data storage elements. A reference length value contained in the one of N number of length-delay data storage elements corresponds to a length value of an information packet being received by the apparatus. The length value of the information packet is determined based on data in the information packet. The byte count comparator detects when the reference delay value number of bytes in the information packet have been received by the apparatus. The signal asserter asserts a reception indication signal when the byte count comparator detects that the reference delay value number of bytes in the information packet have been received by the apparatus. Alternatively, the reception indicator circuit may include a delay calculator that either calculates or selects an interrupt time. In such an alternate reception indicator circuit, the byte count comparator may be replaced by a delay comparator that determines when the interrupt time has elapsed. After the interrupt time has elapsed, the signal asserter asserts the reception indication signal. The apparatus may be a network peripheral, and the medium may be a communications network.

15 Claims, 21 Drawing Sheets

U.S. PATENT DOCUMENTS

| | | | | |
|---|---|---|---|---|
| 5,717,870 | * | 2/1998 | Dobson | 395/250 |
| 5,717,932 | * | 2/1998 | Szczepanek et al. | 395/733 |
| 5,752,078 | * | 5/1998 | Delp et al. | 395/827 |
| 5,754,764 | * | 5/1998 | Davis et al. | 395/677 |
| 5,754,866 | * | 5/1998 | Priem . | |
| 5,805,602 | * | 9/1998 | Cloutier et al. | 370/516 |
| 5,872,920 | * | 2/1999 | Hausman et al. . | |
| 5,875,341 | * | 2/1999 | Blank et al. | 395/733 |
| 5,903,774 | * | 5/1999 | Hannah . | |
| 5,905,874 | * | 5/1999 | Johnson | 395/200.8 |
| 5,926,457 | * | 7/1999 | Feng . | |
| 5,937,138 | * | 8/1999 | Fukuda et al. . | |

OTHER PUBLICATIONS

*RTL8029 Realtek Full–Duplex Ethernet Controller for PCI Interface Advance Information*, Realtek Semi–Conductor Co., Ltd., Dec. 19, 1994.

*Digital Semiconductor 21143 PCI/CardBus 10/100–Mb/s Ethernet LAN Controller Product Breif*, Digital Equipment Corporation, Mar. 26, 1996.

* cited by examiner

INFORMATION PACKET RECEPTION INDICATOR FOR REDUCING THE UTILIZATION OF A HOST SYSTEM PROCESSOR UNIT

BACKGROUND OF THE INVENTION

1. Field of the Invention

The present invention relates to providing an interrupt signal to a host system processor unit to indicate that an information packet being received from a communications network requires processing.

2. Description of the Related Art

A great deal of information is transferred over communications networks. Typically, host computing systems, such as personal computers, operate as nodes on a communications network. Each node is capable of receiving information from the network and transmitting information onto the network.

Information is transferred over a communications network in information packets. The organization of information in an information packet, as well as the procedures for forming and combining information packets, are dictated by a network operating system protocol. There are many different protocols in existence. In fact, information frames that correspond to different protocols can coexist on the same communications network.

In order for a node to receive and transmit information packets, it is equipped with a network peripheral. The network peripheral is responsible for transferring information packets between the communications network and the host system.

A processor unit in the host system assists in the transmission of an information packet by constructing the information packet and passing it to the network peripheral. The processor unit assists in the reception of an information packet by retrieving the information packet from the network peripheral and processing it in accordance with a network operating system protocol.

The processor unit performs many of its transmission and reception functions in response to instructions from an interrupt service routine for the network peripheral. When a received information packet requires processing, an interrupt may be issued to the host system by the network peripheral. The interrupt has traditionally been issued after either all of the bytes in an information packet or a fixed number of bytes in an information packet have been received by the network peripheral.

In response to a packet reception interrupt, the processor unit enters the interrupt service routine and executes the necessary instructions for assisting in the packet reception process. Upon responding to the interrupt, the processor unit ceases the operations that it is presently performing and saves the entire status of the host system.

The time period from the network peripheral asserting an interrupt to the processor unit beginning to execute the interrupt service routine is referred to as interrupt latency. Interrupt latency can be a considerable amount of time, approximately 30 µs–45 µs in a personal computer. Accordingly, it is beneficial for the processor unit to only receive one interrupt for the reception of an incoming information packet.

It is also beneficial to reduce the utilization of the processor unit in executing the interrupt service routine. If the processor unit receives an interrupt too early in a packet's reception, then the processor unit will process the received portion of the packet and sit idly while the rest of the packet is received by the network peripheral. Decreasing the time that the processor unit has to wait idly in an interrupt service routine allows the processor unit more time to perform other useful tasks, such as executing instructions in application programs.

Asserting an interrupt after an information packet has been completely received by a network peripheral ensures that only a single packet reception interrupt is issued for a received information packet. As a result, only a single interrupt latency must be incurred in the processing of the incoming packet. Additionally, the entire information packet is ready to be processed when the host processor unit begins executing the interrupt service routine. This provides for a reduction in the utilization of the processor unit, since there is little, if any, idle time.

However, waiting until after an incoming information packet has been completely received to assert a packet reception interrupt causes the processing of the information packet to be delayed. Such delay includes the interrupt latency time and/or the time required for the processor unit to execute the interrupt service routine. It is desirable to avoid such delay.

The overall performance of a host system as a node is dependent on how rapidly information packets can be processed once they are detected by the network peripheral. A processor unit's prompt processing of incoming information packets enables a host system to quickly assemble and transmit any information packets that are to be sent in response to received information packets. Further, prompt processing of incoming information packets decreases the amount of memory that is required to be used for storing received information packets that are waiting to be processed.

In order to avoid delay in the processing of incoming information packets, reception indicators in network peripherals have been developed to overlap the reception of an incoming information packet with the interrupt latency. These reception indicators do not wait until after the information packet has been fully received to assert an interrupt. These reception indicators issue an interrupt at a predetermined time before an incoming information packet has been completely received by the network peripheral. In such reception indicators, the predetermined time is approximately equal to the host system's interrupt latency.

As a result, the processor unit is able to begin executing the interrupt service routine for the network peripheral at approximately the same time that the information packet has been fully received by the network peripheral. Unfortunately, the processor unit may still have to execute a significant portion of the interrupt service routine subsequent to the information packet's reception having been completed. Such reception indicators are described in U.S. Pat. No. 5,412,782 ("'782 Patent") and U.S. Pat. No. 5,307, 459 ("'459 Patent").

The reception indicator disclosed in the '782 Patent provides for an early receive interrupt to be generated by a network peripheral after a predetermined number of bytes of an incoming information packet have been received. The predetermined number of bytes is programmed into an early receive threshold register in the network peripheral by a host system's user. In response to the early receive interrupt, a host processor unit begins executing an interrupt service routine for the network peripheral.

The interrupt service routine instructs the host processor unit to determine if the network peripheral is still receiving any portion of the same incoming information packet. If the information packet has not been fully received, the interrupt service routine instructs the host processor unit to determine the expected total number of bytes in the information packet and program a new value into the early receive threshold register. The new value is equal to the expected size of the incoming information packet minus the number of information packet bytes that the network peripheral can receive during the host system's interrupt latency. After reprogramming the early receive threshold register, the host processor unit processes the received portion of the information packet and then exits the interrupt service routine.

Once the network peripheral receives the number of information packet bytes that has been newly programmed into the early receive threshold register, the early receive interrupt is generated again for the same information packet. Once again, an interrupt latency delay is incurred by the host system before the host processor unit begins executing the interrupt service routine. Ideally, the entire packet has been received by the network peripheral at the time the processor unit begins executing the interrupt service routine for the second time. This allows the processor unit to complete its processing of the information packet without any further interrupts being needed.

In the reception indicator circuit of the '782 patent, the host processor unit is not forced to be idly trapped in the interrupt service routine, while the network peripheral completes a packet reception. In fact, the host processor is able to leave the interrupt service routine until the information packet has been fully received.

However, the host processor unit may have to respond to two interrupts for the processing of a single information packet. As stated above, the significant amount of time wasted during an interrupt latency makes it undesirable to have a host processor unit respond to more than one interrupt for a single information packet reception. The host processor's time could be better spent performing other tasks in the host system than responding to a second interrupt for the same information packet reception.

The reception indicator disclosed in the '459 Patent provides for a single interrupt to be issued for an incoming information packet reception. The interrupt is issued at an interrupt latency time prior to the end of the information packet's reception. Accordingly, the interrupt latency is overlapped with the reception of the incoming packet to reduce the utilization of the host system's processor unit.

However, the reception indicator in the '459 patent only provides such an interrupt for information packets that adhere to a fixed number of network operating system protocols, which cannot be set by the host system's user. If an information packet conforms to the Institute of Electrical and Electronic Engineers ("IEEE") 802.3 network standard, the reception indicator in the '459 Patent is able to provide a reception interrupt as described above, regardless of the packet's protocol. If the information packet is not an IEEE 802.3 packet, the reception indicator in the '459 Patent does not provide for overlapping the interrupt latency time with the reception of the incoming information packet, unless the packet conforms to a single predetermined protocol type.

This is a notable limitation, since information packets on a single communications network may presently conform to many different protocols. Further, new protocols may become popular as time passes.

Accordingly, it is desirable for a network peripheral to provide only a single interrupt for an incoming information packet's reception. Moreover, the interrupt should be provided so that both interrupt latency and processing of the incoming packet are overlapped with the incoming packet's reception. It is further desirable for the network peripheral to be able to provide such an interrupt for information packets that conform to a user specified network operating system protocol. It is yet more desirable for the network peripheral to be able to provide such an interrupt for a plurality of programmable network operating system protocols. It is also desirable for the network peripheral to provide such an interrupt, so that a processor unit does not have to remain idle during the execution of an interrupt service routine for processing an incoming information packet.

SUMMARY OF THE INVENTION

The present invention enables a reception related interrupt to be issued by a network peripheral at a time that reduces the utilization of a host system's processor unit and overlaps the reception of an incoming information packet with the host system's interrupt latency. In embodiments of the present invention, a network peripheral issues a reception related interrupt early enough before the end of an incoming packet to enable a processor unit to begin processing the packet before the packet is fully received. The network peripheral also provides the reception interrupt, so that the time the processor sits idle in an interrupt service routine is reduced. In determining when to issue the reception interrupt, the network peripheral determines a length value for the incoming packet and employs the length value along with other parameters to determine the time for issuing the reception interrupt. The length value may be determined by the network peripheral based on information in the incoming information packet. Furthermore, the network peripheral may adjust the parameters based on the processing load of the host system's processor unit.

Embodiments of the present invention provide for a network peripheral that is capable of issuing a single interrupt to a host processor to signal that an incoming information packet requires processing. Such an interrupt is issued so that interrupt latency of the host system and processing of the incoming information packet are overlapped with the reception of the incoming packet. Further, network peripherals in accordance with the present invention are able to provide such an interrupt for information packets that conform to a plurality of user specified network operating system protocols. As a result, it is significantly less likely that the processor unit will remain idle during the execution of an interrupt service routine for processing the reception of the incoming information packet.

Embodiments of the present invention include a reception indicator circuit for use in a network peripheral, wherein the network peripheral enables a host system to receive information packets from a communication network. The reception indicator has a delay calculator, a byte count comparator and a signal asserter.

The delay calculator may select and read a reference delay value in one of N number of length-delay data storage elements. A reference length value contained in the one of N number of length-delay data storage elements corresponds to a length value of an information packet being received by the network peripheral. In one embodiment of the present invention, the length value may represent the actual length of the information packet.

The byte count comparator detects when the reference delay value number of bytes in the information packet have been received by the network peripheral. The signal asserter asserts a reception signal when the byte count comparator detects that the reference delay value number of bytes in the information packet have been received by the network peripheral.

Alternatively, the delay calculator may calculate an interrupt time, and the byte count comparator may be replaced with a delay comparator. The delay comparator detects when the interrupt time has elapsed from an instance at which the network peripheral received a first byte of the information packet. The signal asserter then asserts a reception signal when the delay comparator detects that the interrupt time has elapsed.

In order to determine the length value of the information packet, embodiments of the present invention may include a length finder circuit. One embodiment of a length finder circuit will be described in greater detail below with reference to FIG. 4. The length finder circuit retrieves a length-type value of an information packet before the network peripheral generates an interrupt to signal a reception of the information packet. One example of a length-type value is shown in FIG. 6. The length finder circuit then determines whether the length-type value is a valid length. If it is a valid length, the length-type value is written to a data storage element for the length value.

If the length-type value is not a valid length, the length finder circuit determines whether any of M number of length-type data storage elements contain a reference type value that matches the length-type value. M is greater than 1 and each of the M number of length-type data storage elements includes a reference type value field for storing a reference type value and a length offset field for storing a length offset value.

If one of the M number of length-type data storage elements is determined to contain the reference type value that matches the length-type value, a protocol length value of the information packet is retrieved from the information packet. Based on the protocol length value, the length value for the information packet is determined and written to the data storage element for the length value.

BRIEF DESCRIPTION OF THE DRAWINGS

Further details of the present invention are explained with the help of the attached drawings in which.

DETAILED DESCRIPTION

1. The Communications Network

A communications network standard, such as the IEEE 802.3 standard or the DIX Ethernet standard, dictates the physical and logical specifications for a communications network. As part of these specifications, the minimum and maximum sizes of an information frame and information packet are defined, as well as some restrictions on the organization of information in information frames and information packets.

Figure 1:
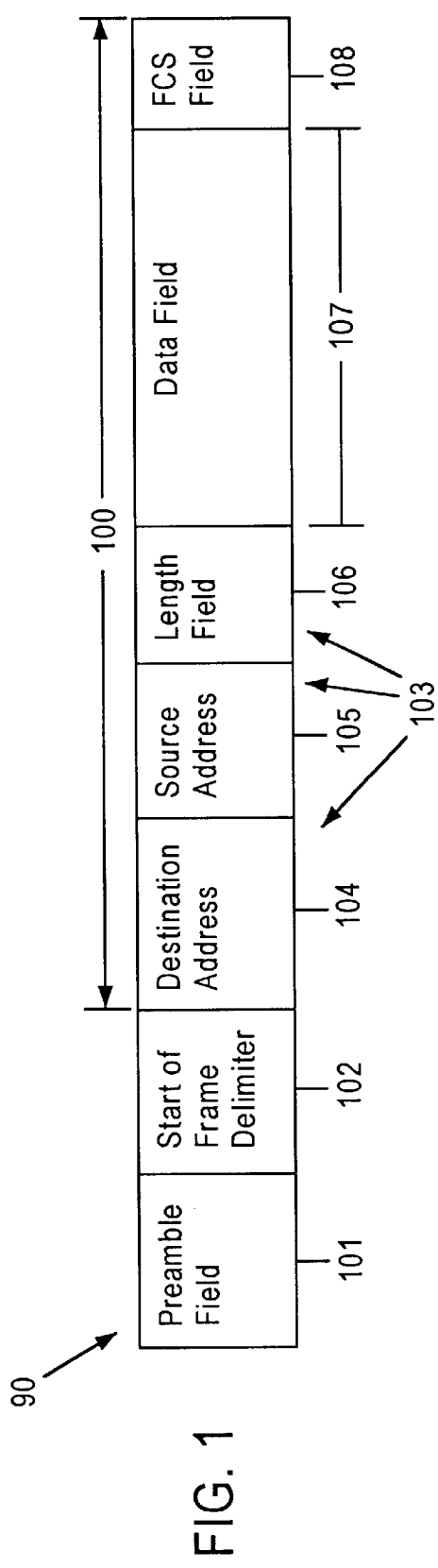
FIG. 1 shows an information frame formatted according to the IEEE 802.3 network standard.

FIG. 1 shows the format of an information frame 90 that is in conformance with the IEEE 802.3 standard for communications networks. The information frame 90 is comprised of an information packet 100, a preamble field 101, and a start of frame delimiter 102. When the information frame 90 is transferred over a communications network, the preamble field 101 is the first portion of the information frame to be both transmitted and received. The preamble field 101 consists of a series of bits that are arranged in a predetermined pattern. The preamble field 101 is provided to enable a node to recognize that an information frame is being transferred on the communications network.

Following the preamble field 101 is the start of frame delimiter 102, which consists of another predetermined pattern of bits. The start of frame delimiter 102 indicates that the next byte in the information frame 90 is the start of the information packet 100. The preamble 101 and start of frame delimiter 102 are comprised of 64 bits, which are discarded by receiving nodes on the communications network and never loaded into any type of data storage medium. The first byte of a header field 103 is the first byte of the information packet 100 that is not discarded.

The header field 103 immediately follows the start of frame delimiter 102. The header field 103 includes a destination address 104, a source address 105, and a length field 106. The destination address 104 is the first six bytes of information in the header field 103. It indicates the address of the node or nodes that are intended recipients of the information packet 100. The source address 105 is the six bytes of information that follow the destination address 104. It indicates the address of the node that transmitted the information packet 100. The length field 106 follows the source address 105, and it consists of two bytes of information, which indicate the number of bytes that are in a data field 107 of the information packet 100.

The data field 107 immediately follows the header field 103, and it consists of between 46 and 1500 bytes of information. A four byte frame check sequence ("FCS") field 108 follows the data field 107. The FCS field 108 contains a checksum that is generated by the transmitting node and read by the receiving node to determine whether any of the bytes in the information packet 100 have been corrupted. In some instances, the information packet 100 may not include the FCS field 108.

Figure 2:
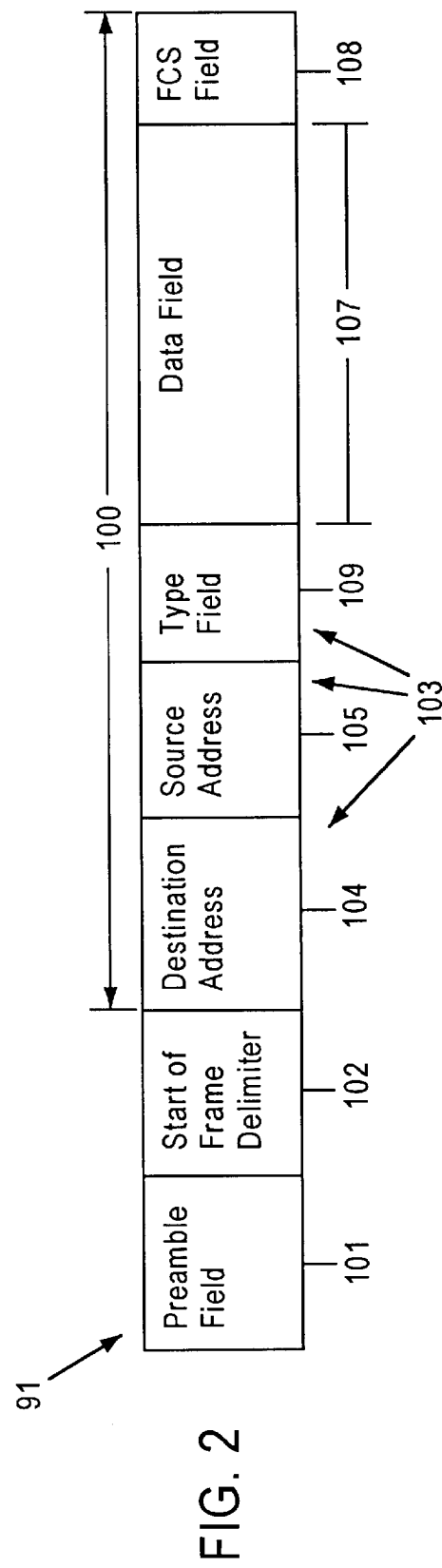
FIG. 2 shows an information frame formatted according to the DIX Ethernet network standard.

FIG. 2 shows the format of an information frame 91 in conformance with the DIX Ethernet standard for communications networks. The information frame's preamble field 101, start of frame delimiter 102, destination address 104, source address 105, data field 107, and FCS field 108 are the same as the corresponding fields in the IEEE 802.3 standard information frame 90. However, the DIX Ethernet standard information packet 100 has a two byte type field 109, instead of the length field 106 that is called for in the IEEE 802.3 standard. The type field 109 indicates the network operating system protocol of the information packet 109.

The information frames appearing in FIG. 1 and FIG. 2 are only two possible information frames that can be used with embodiments of the present invention. One with ordinary skill in the art will recognize that the present invention is not restricted to the IEEE 802.3 and DIX Ethernet standards. Embodiments of the present invention can be made or used to operate with information frames that are in conformance with many other communication network standards, such as token ring, fiber distributed data interface, and many more.

The standards for managing information packets within a communications network are dictated by a network operating system. The network operating system typically defines a protocol that specifies the ordering of information within the data field 107 of the information packet 100. Often, a network operating system protocol will require that a protocol header having a protocol length field be included in the data field 107. The protocol length field typically specifies the number of bytes in the packet's data field 107.

Figure 3:
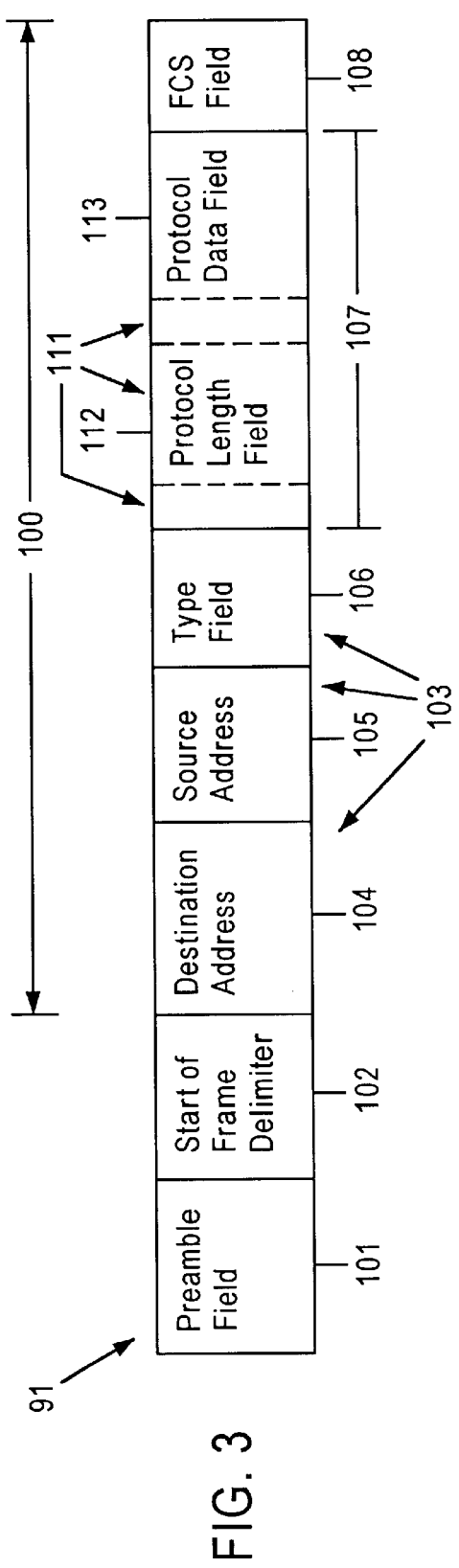
FIG. 3 shows an information frame formatted according to the DIX Ethernet network standard that includes a protocol length field and a protocol data field.

FIG. 3 shows the DIX Ethernet standard information frame 91 of FIG. 2 having an information packet 100 that includes a protocol header field 111, protocol length field 112, and protocol data field 113. The protocol data field 113 is the portion of the information packet's data field 107 that contains information other than the protocol header 111. The protocol length field 112 is within the protocol header field 111, and it indicates the combined number of bytes that are in the protocol header field 111 and the protocol data field 113, which combine to comprise the data field 107 of the packet 100. Each node that resides on a communications network transfers and manages information packets in accordance with both a communication network standard and network operating system protocol.

Furthermore, several logical sub-networks can exist within a single communications network. Although all the sub-networks may be operating under the same communications network standard, each sub-network may alternatively be operating under a different network operating system. As a result, a first node on a sub-network may receive information packets from other nodes on other sub-networks that do not conform to a protocol used by the first node. This can occur when broadcast packets are transmitted onto the communication network or the first node does not perform complete address filtering. Although such non-conforming packets will eventually be discarded, they may initially be received by the first node and transferred to a host system's memory. Accordingly, it is desirable to provide for minimizing the utilization of the processor unit in the reception of information packets that have both conforming and non-conforming protocols.

2. The Network Peripheral

In order for a host system to operate as a node on a communications network, it may be connected to the communications network by a network peripheral. A network peripheral is any device or combination of devices that operate together to provide for the transfer of information between the host system and the communications network. In some instances, the network peripheral may be an adapter card that resides in a host system's backplane or a PCMCIA card. In other instances, the network peripheral may be a single integrated circuit or set of integrated circuits that reside on the host system's motherboard. One with ordinary skill in the art will recognize that these are only examples of network peripherals and that many others exist. Additionally, a host system may be any type of processor or system that processes information, such as data, video and/or voice communications. The term host system may be understood to include the data processing circuitry, microcode, software, and other components of many different types of systems, including computers, network printers, networking bridges, networking routers and other network computing devices.

Figure 4:
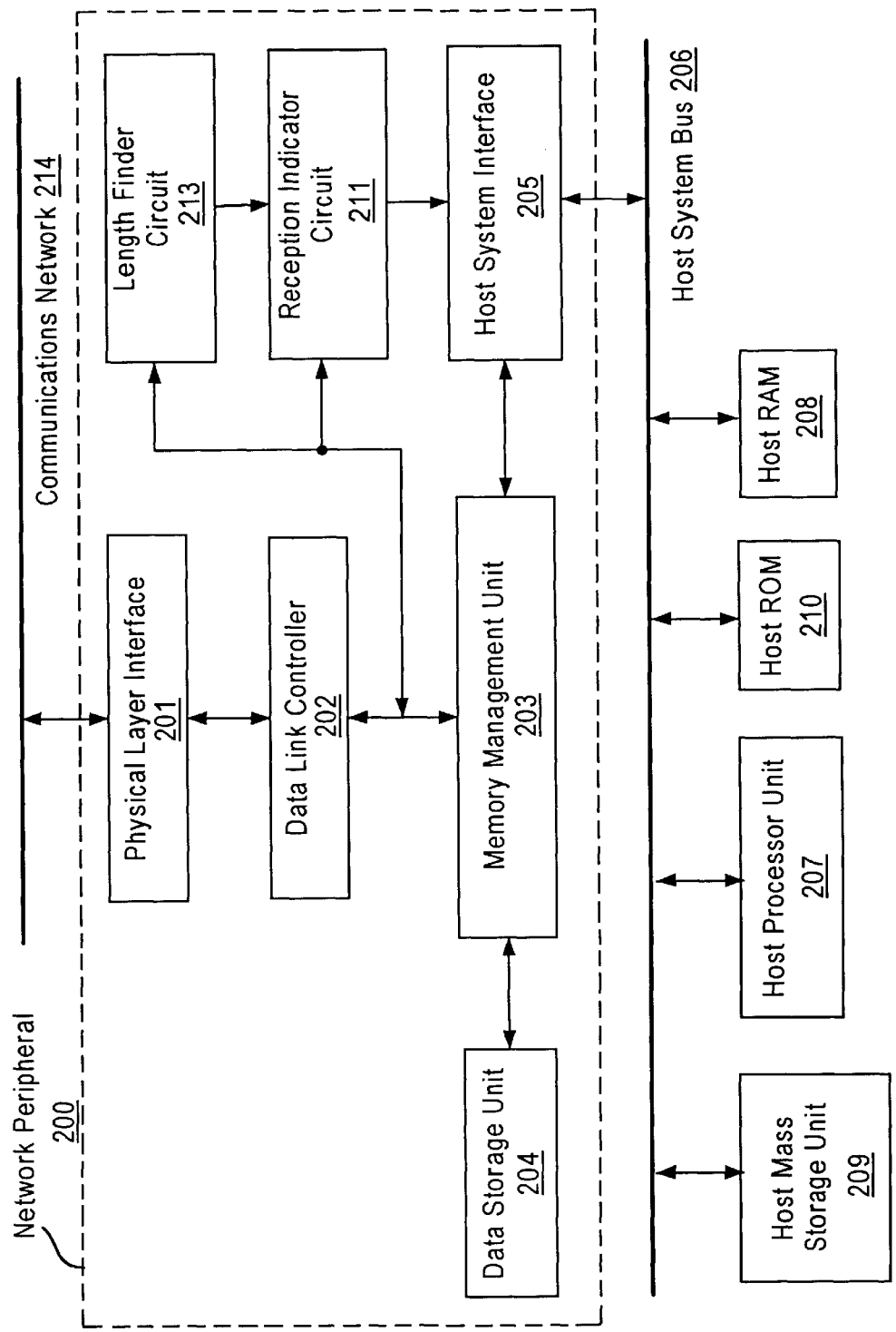
FIG. 4. shows a network peripheral in accordance with embodiments of the present invention.

FIG. 4 displays a network peripheral 200 in accordance with the present invention. The network peripheral 200 includes a physical layer interface 201, a data link controller 202, a memory management unit ("MMU") 203, a data storage unit 204, a host system interface 205, a length finder circuit 213, and a reception indicator circuit 211. The network peripheral 200 may be designed to operate in conformance with many different types of communications network standards, for transferring information packets that include either data communications, voice communications, video communications, or a combination thereof.

In one embodiment of the present invention, the network peripheral 200 is adapted to operate with a communications network having either a DIX Ethernet or IEEE 802.3 network standard for the transfer of information packets carrying data at a bit rate of 10 Megahertz. Due to the similarity of the IEEE 802.3 packets and DIX Ethernet packets, these two forms of information packets can easily coexist on the same communications network. In an alternate embodiment of the present invention, the network peripheral 200 is adapted to operate with a communications network having a network standard for the transfer of information packets at a bit rate of 100 Megahertz. In another embodiment of the present invention, the network peripheral 200 can be programmed to operate in accordance with either a 10 Megahertz bit transfer rate network standard, a 100 Megahertz bit transfer rate network standard, or both the 10 Megahertz and 100 Megahertz network standards. Although the network peripheral's operation will be described with respect to specific types of information packets, one with ordinary skill in the art will recognize that the network peripheral 200 is not limited to only operating with information packets of these types.

The physical layer interface 201 connects directly to the physical medium of a communications network 214. During a transmission, the physical layer interface 201 converts the host system signals that constitute an information frame into signals that are in conformance with the signaling requirements of the communications network 214. During a reception, the physical layer interface 201 converts the communications network signals that constitute an information frame into signals that are in conformance with the signaling requirements of the host system.

The data link controller 202 is coupled to the physical layer interface 201 and transfers information packets between the network peripheral 200 and the physical layer interface 201. The data link controller 202 ensures that the information packets are transmitted and received in accordance with the timing and network management specifications of the network standard for the communications network 214. During a reception of an IEEE 802.3 or DIX Ethernet information frame, the data link controller 202 is responsible for stripping away the preamble field 101 and start of frame delimiter 102 and only passing the information packet 100 to the memory management unit 203 in the network peripheral 200. During a transmission of an information packet 100, the data link controller 202 is responsible for appending a preamble field 101 and start of frame delimiter 102 to the information packet 100, in order to form an information frame. The data link controller 202 also provides network management statistics that can be used by a host system to monitor and respond to activities on the communications network 214.

The memory management unit 203 is coupled to the data link controller 202, host system interface 205, and data storage unit 204. The MMU 203 coordinates the flow of data between the data link controller 202, the host system interface 205, and the data storage unit 204.

The data storage unit 204 holds data that is used in the operation of the network peripheral 200. The data stored in the data storage unit 204 can contain many different types of information, including the following: information packets that are waiting to be transmitted onto the communications network 214, information packets received from the communications network 214 that are waiting to be processed by a host system, descriptor data for locating and linking information packets and segments of information packets, commands to the network peripheral 200, communications network status information, information packet status information, and network management information. The data storage unit 204 may be made from a combination of different electronic data storage circuitry. This circuitry can include, but is not limited to, random access memory, content addressable memory, sequential and combinational register logic, read only memory, first-in first-out ("FIFO") memory, or a combination thereof.

The host system interface 205 is coupled to a host system bus 206 and provides for the transfer of data between the host system bus 206 and the network peripheral 200. The host system interface 205 both transmits and receives data, address, and control signals that enable a host processor unit 207 to communicate with the network peripheral 200 over the host system bus 206. Although the host system interface 205 is shown to be directly connected to the host system bus 206, it may alternatively be coupled to the host system bus 206 through either standard or proprietary logic (not shown).

The reception indicator circuit 211 is coupled to the memory management unit 203, data link controller 202, host system interface 205, and length finder circuit 213. The reception indicator circuit 211 provides a reception signal to the host system interface 205 to indicate that an interrupt should be issued to the host processor unit 207 to cause the processor unit 207 to begin processing an incoming information packet. In response, the host system interface 205 issues an interrupt signal from the network peripheral 200 to the host system bus 206. The reception indicator circuit 211 determines when such an interrupt should be issued based upon information it retrieves from the data storage unit 204, data link controller 202, and length finder circuit 213.

The length finder circuit 213 is coupled to the data link controller 202, MMU 203 and reception indicator circuit 211. The length finder circuit 213 determines a length value for an incoming information packet based upon data it retrieves from the data link controller 202. The length value is then available to be retrieved by the reception indicator circuit 211.

The host system bus 206 is not required to be any particular type of bus. Its function is to provide for the transfer of data, address, and control signals between the network peripheral 200 and the host processor unit 207. In one embodiment of the present invention, the host system bus 206 is the host system's backplane, such as an ISA-Bus or EISA-Bus. In an alternate embodiment of the present invention, the host system bus 206 is a proprietary bus on a host system's motherboard. In further embodiments of the present invention, the host system bus 206 may be a Peripheral Component Interconnect ("PCI") bus. One with ordinary skill in the art will recognize that the host system bus 206 can be any bus that transfers address, data, and control signals, which enable the host system interface 205 to communicate with components of the host system, such as the host processor unit 207.

The host processor unit 207 is coupled to the host system bus 206. Although the host processor unit 207 in FIG. 4 is directly connected to the host system bus 206, the host system bus 206 may alternatively be a secondary bus that is coupled to the host processor unit 207 through any form of standard or proprietary interface logic (not shown). The host processor unit 207 may be comprised of any electronic circuitry for performing data processing, including a microprocessor.

A host random access memory ("host RAM") 208, a host read only memory ("host ROM") 210, and a host mass storage unit 209 may also be coupled to the host system bus 206. The host mass storage unit 209 may be either a hard disk drive, floppy disk drive, compact-disc read only memory ("CD ROM") drive, or other means that either contains data or instructions for the host processor unit 207 or is capable of reading media that contain data or instructions for the host processor unit 207.

Figure 5:
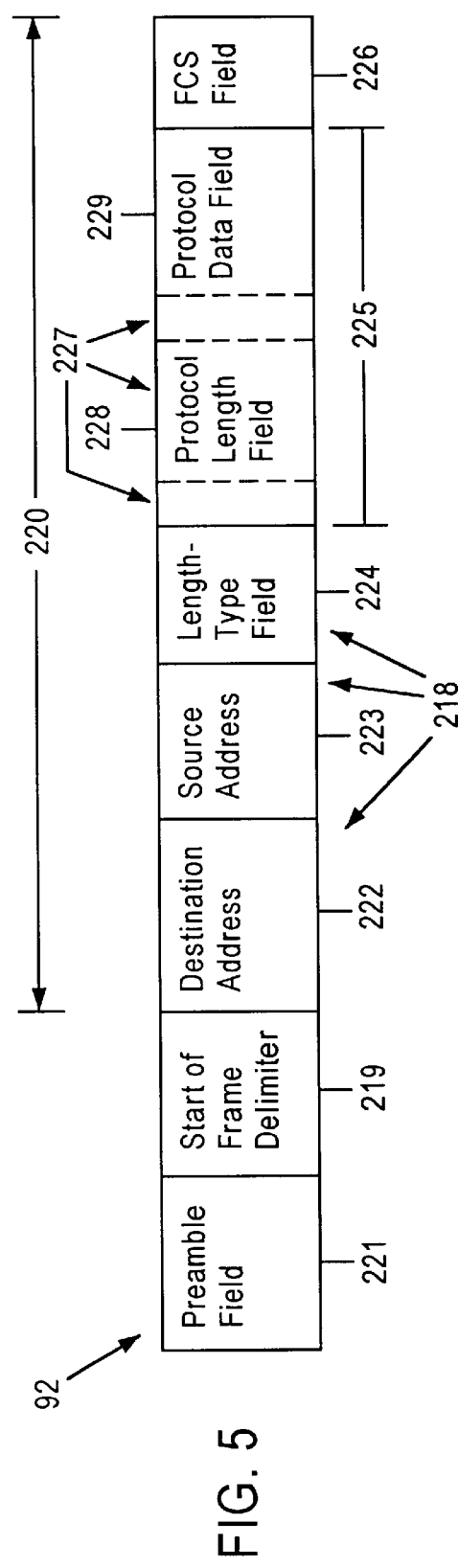
FIG. 5 shows an information frame that is being transferred on a communications network that is linked to the network peripheral in FIG. 4.

FIG. 5 displays an information frame 92, including an information packet 220, that may be transferred on the communications network 214 in FIG. 4. In accordance with the present invention, the information frame 92 has a preamble field 221, start of frame delimiter 219, destination address 222, source address 223, data field 225 and FCS field 226, which are the same as the corresponding information packet segments in FIG. 1 and FIG. 2. The information packet 220 also has a length-type field 224. The length-type field can indicate either a length or a type, depending on which communications network standard governs the format of the information packet 220. Although the information frame 92 in FIG. 5 may conform with either the IEEE 802.3 or DIX Ethernet standard, one with ordinary skill in the art will recognize that in embodiments of the present invention the information frame 92 in FIG. 5 may be substituted with information frames that conform to many different standards.

The network peripheral 200 (FIG. 4) begins receiving an information frame, such as frame 92, through the physical layer interface 201 and the data link controller 202. After the start of frame delimiter 219 is recognized by the data link controller 202, the data link controller 202 begins passing the incoming portions of the information packet 220 to the memory management unit 203. The memory management unit 203 loads the data from the information packet 220 into the data storage unit 204. After being stored in the data storage unit 204, data from the information packet 220 may need to be transferred to the host RAM 208. The host system interface 205, in combination with the MMU 203, enable the transfer of the information packet data 220 from the data storage unit 204 to the host RAM 208.

In one embodiment of the present invention, the host system interface 205 operates in a programmed I/O mode. In this mode, the host system interface 205 retrieves a portion of the received information packet from the data storage unit 204 through the MMU 203. The host system interface 205 then places the retrieved portion into a readable data port in the host system interface 205. The host processor unit 207 reads the retrieved portion from the readable data port in the host system interface 205 and then writes the retrieved portion to the host RAM 208. This process is repeated until the entire information packet 220 has been placed in the host RAM 208. Alternatively, a direct memory access ("DMA") controller (not shown) in the host system may be used to perform the aforementioned function of the host processor unit 207 in the programmed I/O mode.

In an alternate embodiment of the present invention, the host system interface 205 operates in a DMA mode. In the DMA mode, the host system interface 205 retrieves a portion of the information packet 220 from the data storage unit 204 through the MMU 203. The host system interface 205 then directly writes the retrieved portion into the host RAM 208 over the host system bus 206. In order to know where to place the retrieved portion, the host system interface 205 retrieves receive descriptors from the data storage unit 204. The receive descriptors contain the host RAM 208 locations that should be used for storing information packets. The receive descriptors are compiled and transferred to the network peripheral 200 by the host processor unit 207. Alternatively, the host processor unit 207 can provide the receive descriptors to the host system interface 205.

In addition to the aforementioned data processing operations, the host processor unit 207 performs other processing operations related to incoming information packets. This processing includes monitoring the status of received information packets to determine if any errors occurred during their reception and passing such status information to higher levels of the network operating system.

The host processor unit 207 performs information packet data transfer and processing operations by executing instructions in an interrupt service routine ("ISR") for the network peripheral 200. The ISR is comprised of instructions that direct the actions of the host processor unit 207. The ISR may be stored in either the host RAM 208 or the host ROM 210. The ISR may alternatively be stored on the host mass storage unit 209, if the host mass storage unit 209 is a fixed medium, such as a fixed disk drive. The ISR may also be stored on a portable medium that can be read by the host mass storage unit 209, such as a floppy disk, a CD-ROM, and/or a PCMCIA card.

When it is desirable for the host processor unit 207 to process the reception of an incoming information packet 220, the network peripheral 200 generates an interrupt signal, via the reception indicator circuit 211 and the host system interface 205. In response to the interrupt, the host processor unit 207 begins executing the ISR. The interrupt signal may also be asserted by the network peripheral 200 when the network peripheral 200 requires the host processor to take other actions, such as processing the transmission of an information packet.

In order to provide for a single reception interrupt that enables rapid processing of an incoming information packet 200, the interrupt signal may be issued when an interrupt time number of bytes of the information packet 220 remain to be received by the network peripheral 200. In accordance with the present invention, the interrupt time number of bytes is substantially equal to the number of bytes that can be received by the network peripheral 200 in a time equal to the interrupt latency time of the host system plus a significant portion of the time required to process reception of the incoming information packet 220. As a result, the interrupt latency and host processor unit's 207 execution of the ISR is substantially overlapped with the reception of the incoming information packet 220.

Figure 6:
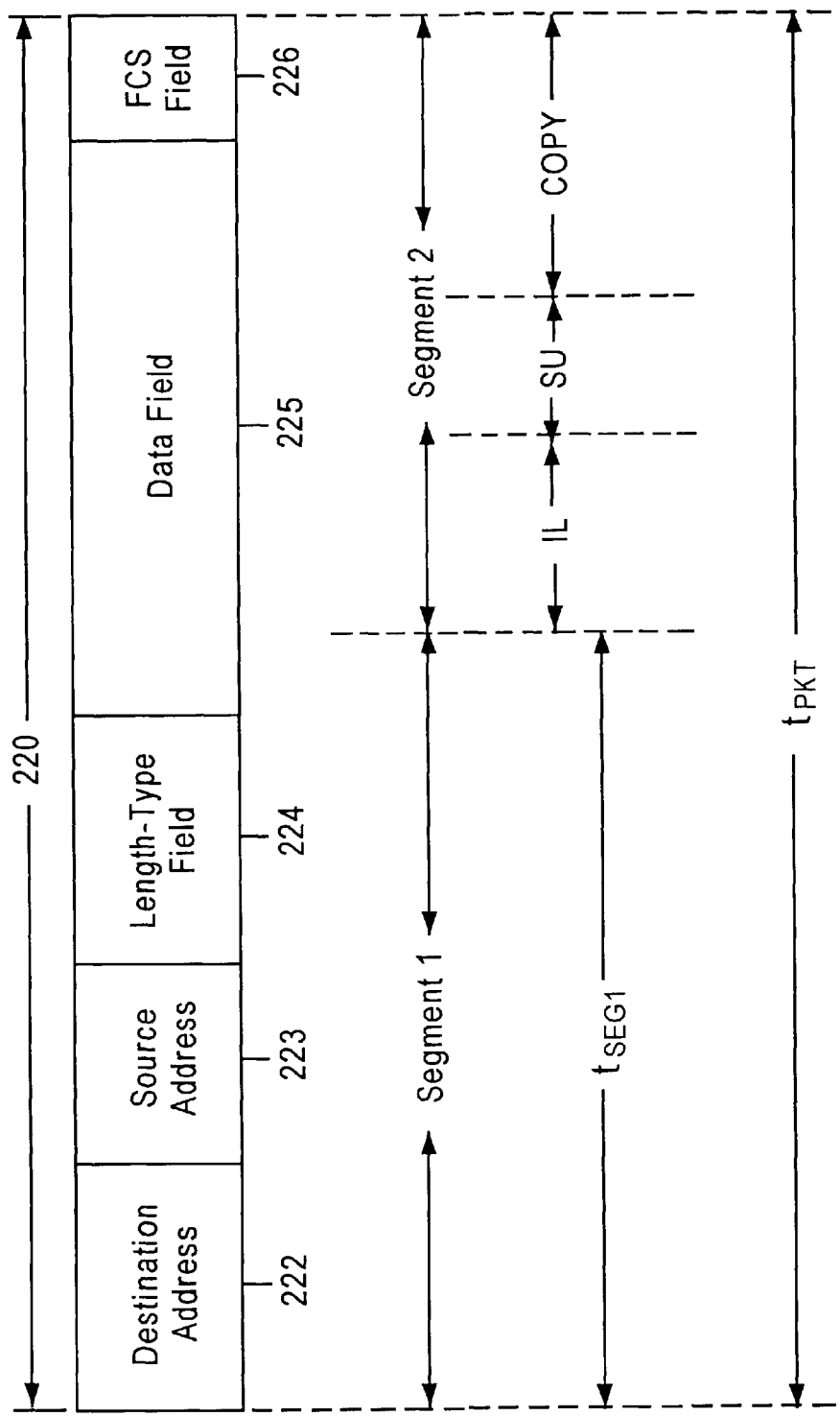
FIG. 6 shows the information packet of FIG. 5 containing a Segment 1 and a Segment 2.

FIG. 6 provides an illustration of the interrupt time number of bytes with respect to the information packet 220 in FIG. 5. In FIG. 6, the interrupt time number of bytes is identified as Segment 2, while the remainder of the information packet 220 is identified as Segment 1. Segment 2 can be broken down into 3 components. The first component is IL, which represents the number of bytes that can be received by the network peripheral 200 during the interrupt latency time of the host system. The second component is SU, which represents the number of bytes that can be received by the network peripheral during the time that the host processor unit 207 executes any initialization or setup portion of the ISR. During such an initialization or setup portion of the ISR, the host processor unit 207 typically determines where to store the incoming information packet 220 in the host RAM 208. The third component is COPY, which represents the number of bytes that can be received by the network peripheral 200 in the time that the incoming information packet 220 can be transferred from the network peripheral 200 to the host RAM 208.

3. The Reception Indicator Circuit a. Employing a Segment 2 Value

Figure 7:
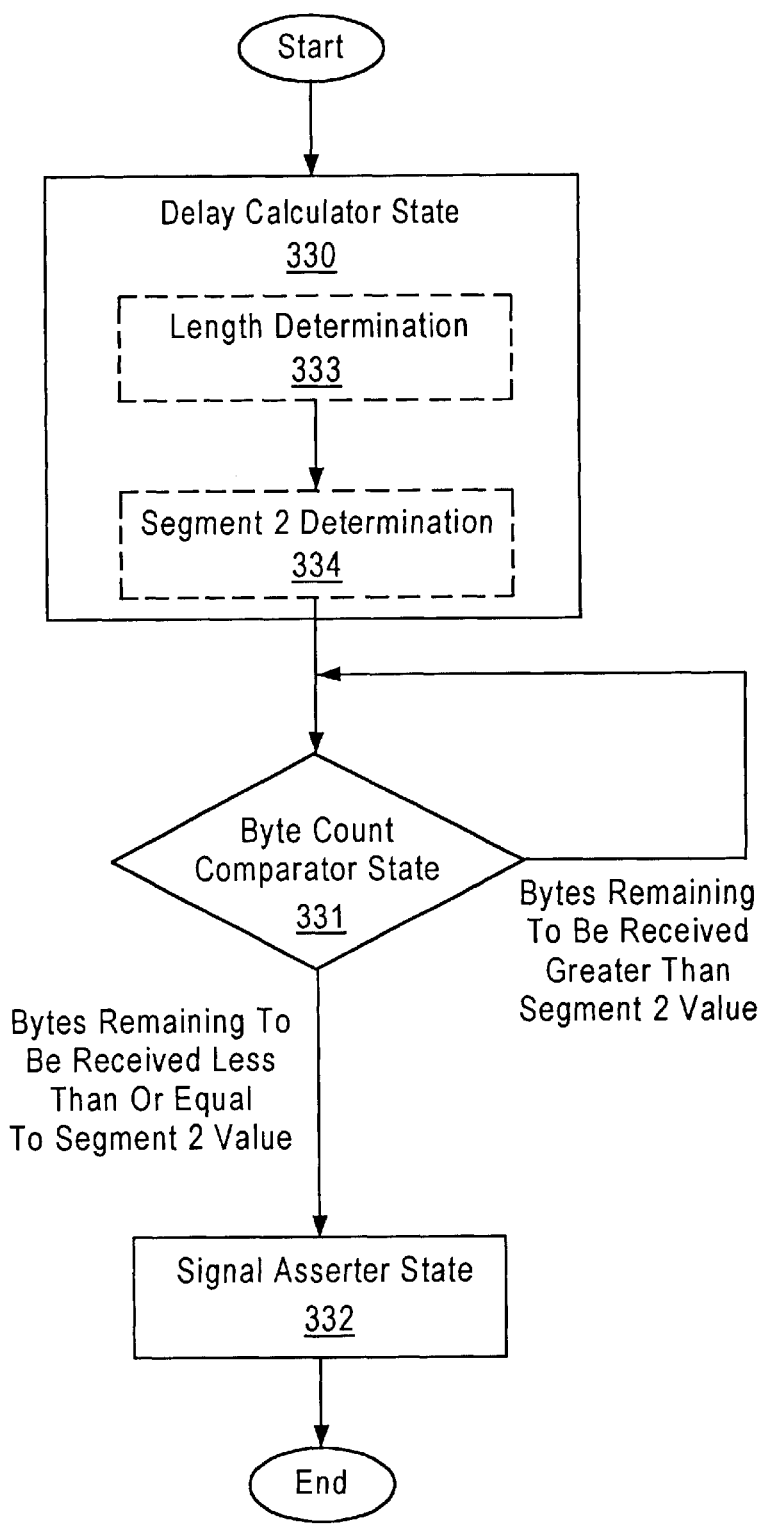
FIG. 7 shows a sequence of operations for the reception indicator circuit in one embodiment of the present invention.

FIG. 7 shows a sequence of operations performed by the reception indicator circuit 211 in one embodiment of the present invention. One with ordinary skill in the art will recognize that many different electronic circuitry embodiments of the reception indicator circuit 211 may be designed to conform with this sequence of operations. In such an embodiment, the reception indicator circuit 211 provides for the assertion of a reception interrupt at a time that is measured from the end of an incoming information packet. A length value for the information packet is retrieved and decremented in response to incoming bytes in the packet to determine when the interrupt is to be asserted.

In a delay calculator state 330, the reception indicator circuit 211 first performs a length determination step 333. In the length determination step 333, a length value for the incoming information packet 220 is retrieved from a data storage element. As will be described in greater detail below, the length value may be determined by the length finder circuit 213 (FIG. 4) and loaded into the data storage element. In accordance with the present invention, the length value may indicate the number of bytes that are in the information packet's data field 225. In one embodiment of the present invention, the data storage element for the length value resides in the data storage unit 204 and is accessed by the reception indicator circuit 211 through the MMU 203. In alternate embodiments of the present invention, the data storage element for the length value may reside in either the data link controller 202 or the length finder circuit 213. The data storage element for the length value may be formed by register logic circuits, random access memory, or other suitable means.

Figure 8:
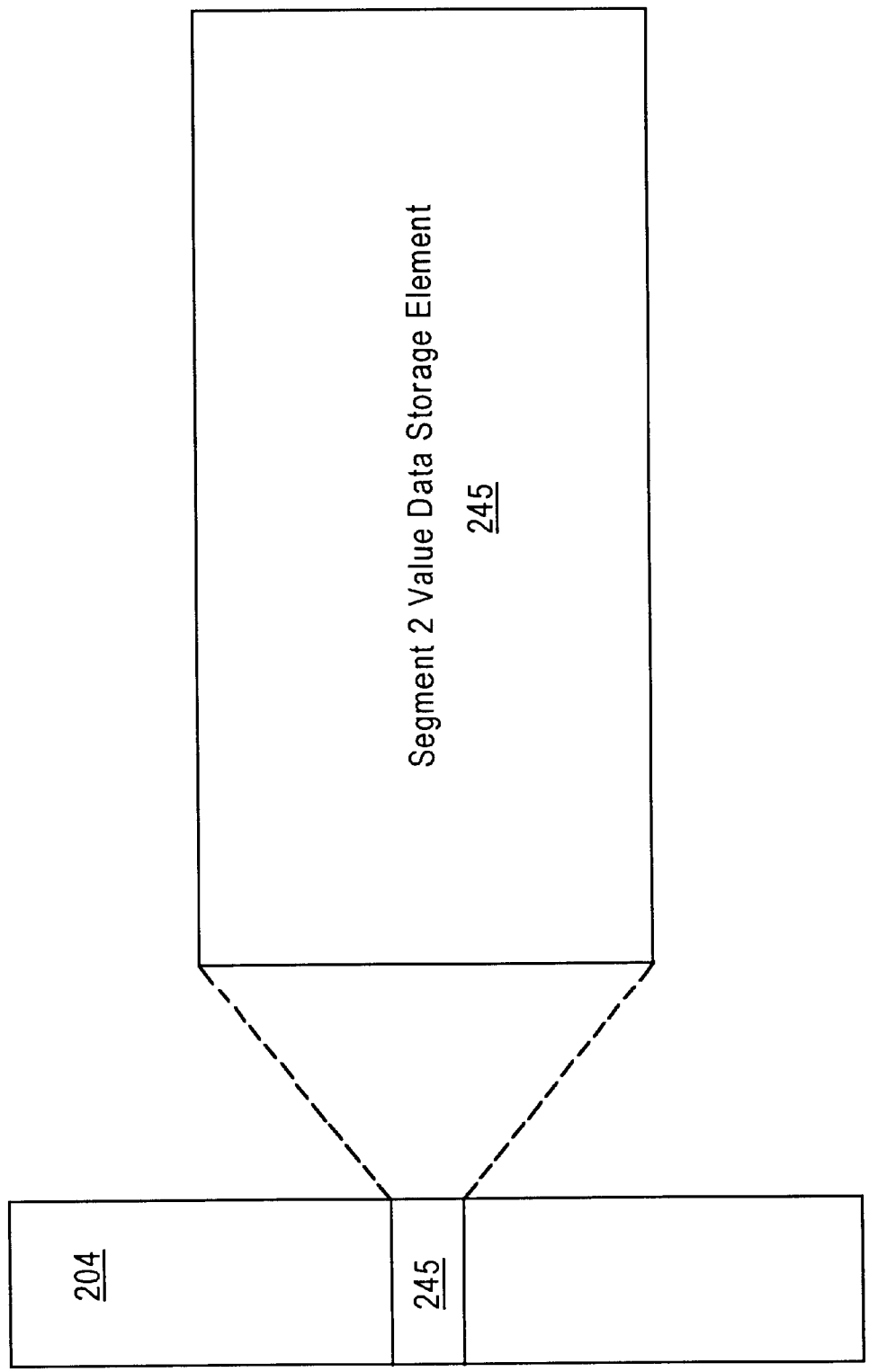
FIG. 8 shows a segment 2 value data storage element in one embodiment of the present invention.

Next in the delay calculator state 330, the reception indicator circuit 211 executes a segment 2 determination step 334 (FIG. 7), wherein the length finder circuit 211 determines a segment 2 value. The segment 2 value is an approximation of the number of bytes in segment 2 of the incoming information packet 220 (FIG. 6). In order to obtain this value, the reception indicator circuit 211 reads the segment 2 value from a segment 2 value data storage element 245. As described in greater detail below, the segment 2 value may be calculated by the host processor 207 during a prior execution of the ISR. The segment 2 value data storage element 245 is shown in FIG. 8 and may reside in the data storage unit 204, where it is accessible by the reception indicator circuit 211, and host processor unit 207. Under many circumstances the segment 2 value will be the same or close to the same for most packets.

Once the segment 2 value is determined, the reception indicator circuit 211 enters the byte count comparator state 331 to monitor the number of bytes of the incoming information packet 220 that are received by the network peripheral 200. The reception indicator circuit 211 performs this monitoring through its link to the data link controller 202.

In one embodiment of the present invention, the reception indicator circuit 211 transitions to a signal asserter state 332, once the network peripheral 200 has received all of the incoming information packet 220, except for the segment 2 value number of bytes. In the signal asserter state 332, a reception signal is asserted and provided to the host system interface 205 (FIG. 4). As a result, the host system interface 205 generates an interrupt that is provided to the host processor unit 207.

The byte count comparator 331 (FIG. 7) may determine when the segment 2 value number of bytes remain by decrementing the retrieved length value in response to the network peripheral 200 receiving bytes of the incoming information packet and comparing the result to the segment 2 value. If the length value is equal to the number of bytes in the packet's data field 225 (FIG. 5), then the decrementing would begin after the reception of the first byte in the data field 225.

Figure 9:
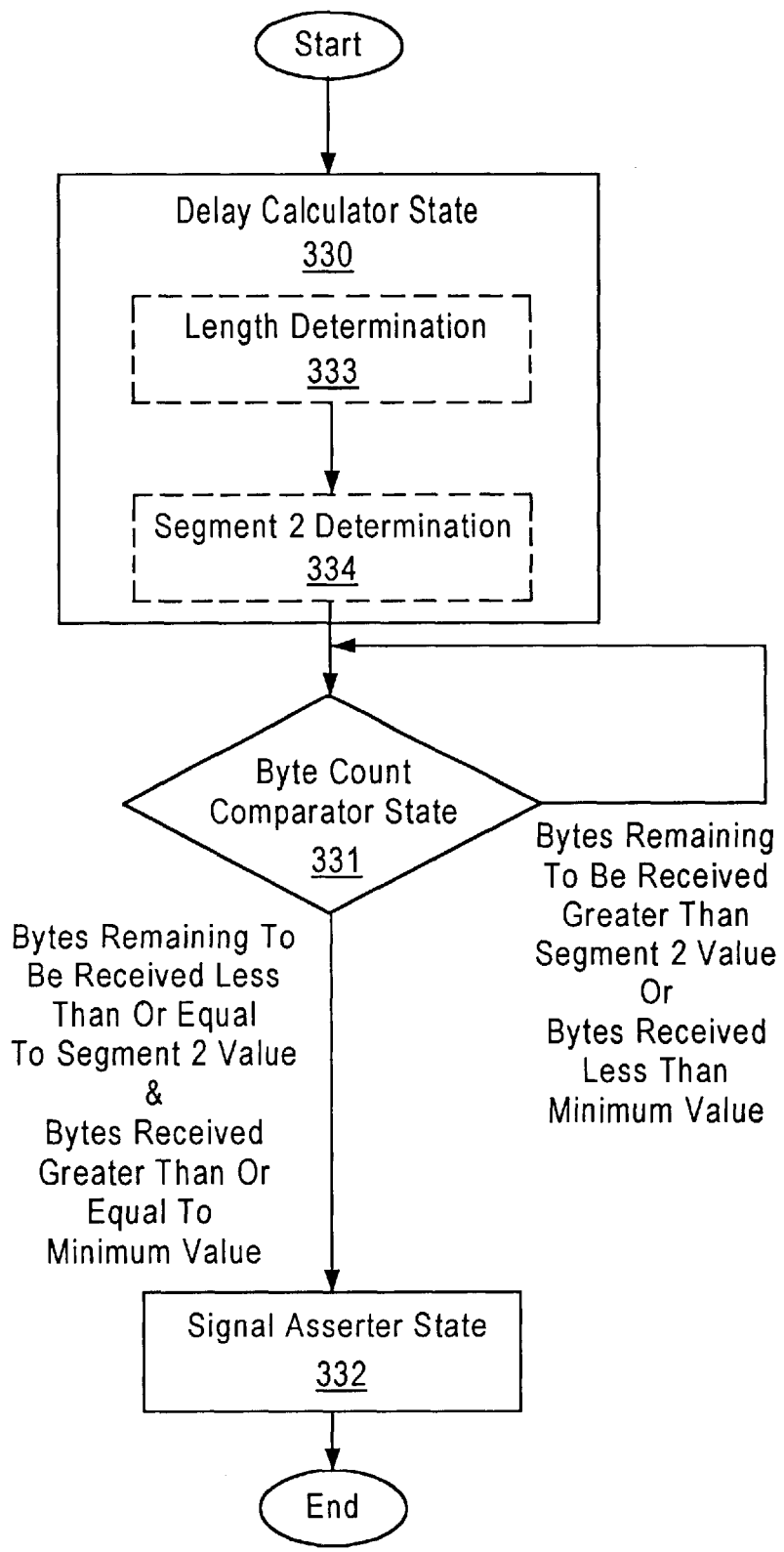
FIG. 9 shows a sequence of operations for the reception indicator circuit in an alternate embodiment of the present invention.

An alternate embodiment of the present invention is shown in FIG. 9. In the embodiment shown in FIG. 9, the transition from the byte count comparator state (331) to the signal asserter state (332) is performed based on two different criteria. Once the network peripheral 200 receives at least a minimum value number of bytes of the incoming information packet 220 and only the segment 2 number of bytes, or less bytes, remain to be received, then the reception indicator circuit 211 transitions to the signal asserter state 332. The minimum value number of bytes is the number of bytes of an incoming information packet that must be received to indicate that the incoming packet is not merely a fragment of a packet. In the IEEE 802.3 standard and DIX Ethernet standard, the minimum value is 64 bytes.

Figure 10:
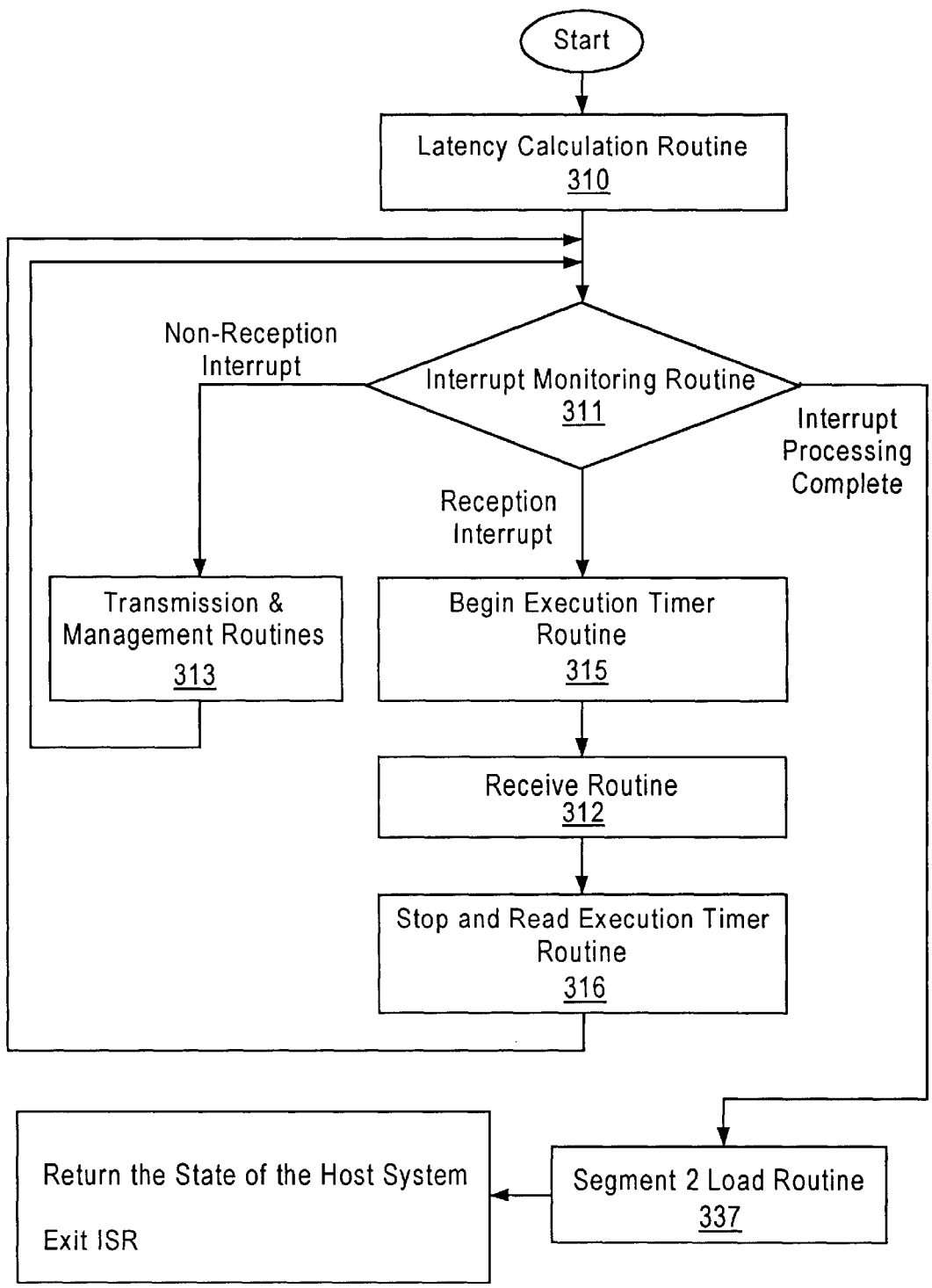
FIG. 10 shows steps executed in an interrupt service routine for processing and receiving an information packet in one embodiment of the present invention.

FIG. 10 shows one embodiment of steps for an ISR that can be used with a network peripheral 200 (FIG. 4) that includes the reception indicator circuit 211 described above. The first step in the ISR is the latency calculation routine 310. Here, the host processor unit 207 is instructed to disable all host system interrupts and instruct the network peripheral 200 to deassert its interrupt signal.

Next, the host processor is instructed to retrieve a latency value, which reflects the interrupt latency time of the host system. In one embodiment of the present invention, the latency value may be read from an interrupt latency counter 270 (FIG. 11) in the network peripheral. In an alternate embodiment of the present invention, the latency value may be retrieved from a circuit in the network peripheral 200 that determines the average interrupt latency time for the host system. Such a circuit for obtaining the average value for the interrupt latency time is disclosed in a U.S. Patent Application entitled Device to Measure Average Timing Parameters, by Robert Alan Williams, filed on Jun. 25, 1997, and hereby incorporated by reference. In a further embodiment of the present invention, a latency value may be retrieved after the ISR has been executed a number of times, instead of each time the ISR is executed. Such a latency value could then be employed to obtain an average latency value to be used until a new latency value is calculated after another set of ISR executions.

Once the latency value is obtained, the host processor unit 207 is instructed to convert the latency value into a latency value number of bytes. The latency value number of bytes is equal to the number of bytes that could be received by the network peripheral 200 during the latency value time. This byte count is approximately equal to the interrupt latency (IL) portion of the incoming information packet 220. Alternatively, the latency value may already be equal to the latency value number of bytes, in which case no conversion is performed.

Figure 11:
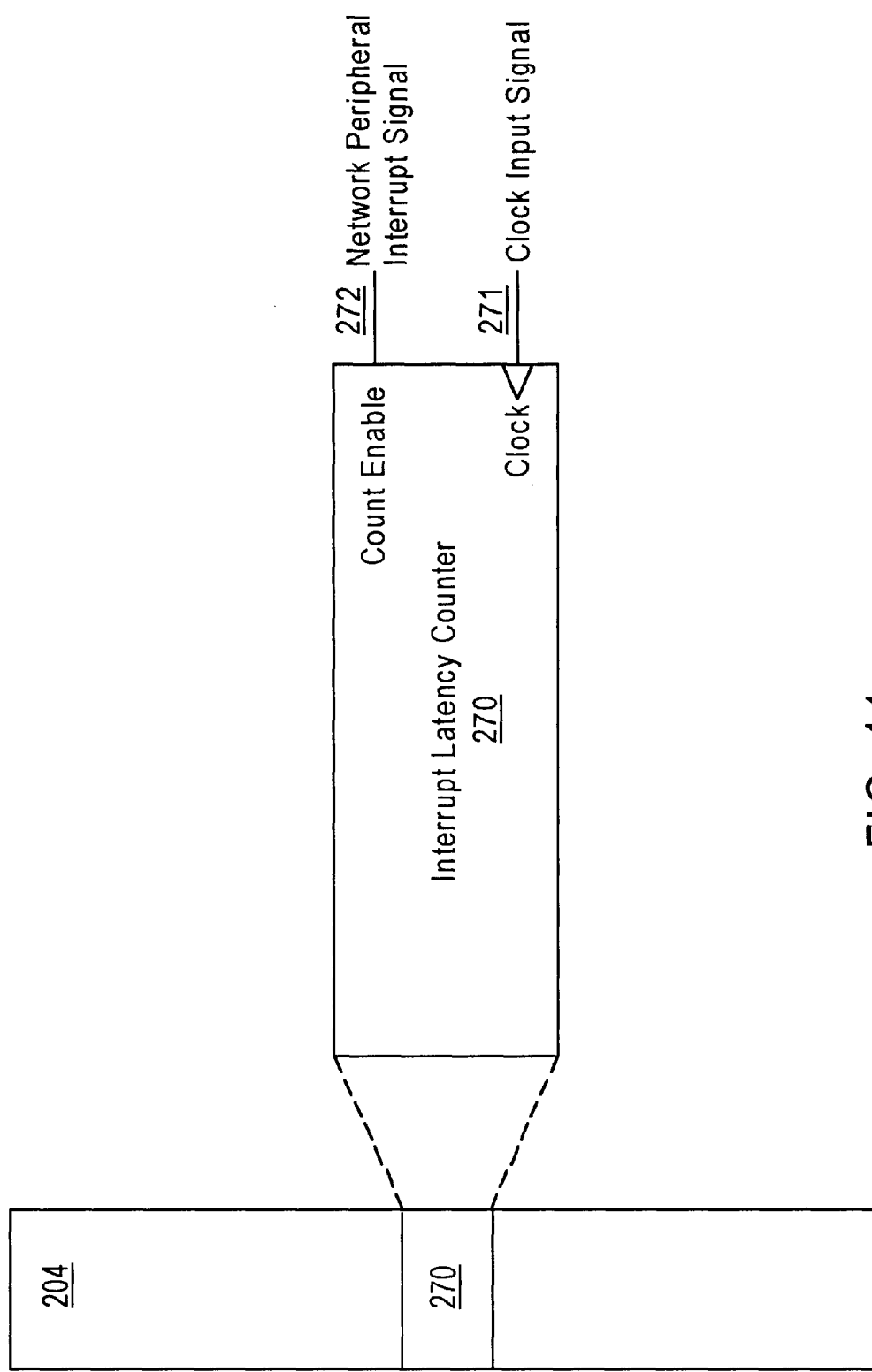
FIG. 11 shows an interrupt latency counter that is included in one embodiment of the present invention.

FIG. 11 shows an interrupt latency counter 270 that may be used in accordance with the present invention to provide a latency value. The interrupt latency counter 270 may reside in the data storage unit 204 and can be read by the host processor unit 207 through the host system interface 205 in combination with the MMU 203. Alternatively, the interrupt latency counter may reside in the host system interface 205.

The interrupt latency counter 270 is incremented by a clock input signal that is coupled to the interrupt latency counter's clock input 271. The interrupt latency counter has a clock enable input 272 that is coupled to the network peripheral interrupt signal. As a result, the interrupt latency counter 270 increments while the network peripheral interrupt signal is asserted. The interrupt latency counter 270 stops counting when the network peripheral's interrupt signal is deasserted.

In one embodiment of the present invention, the clock rate of the clock input signal is equal to the rate that information packet bytes are received from the communications network 214 by the network peripheral 200. As a result, the latency value number of bytes is equal to the value stored in the interrupt latency counter 270 when the ISR instructs the host processor unit 207 to read the counter 270.

Once the latency value is converted into a number of bytes, the ISR transitions to an interrupt monitoring routine 311. The ISR instructs the host processor unit 207 (FIG. 4) to determine what processing is required by the network peripheral 200. In one embodiment of the present invention, the host processor unit 207 makes this determination by reading an interrupt data storage element (not shown) in the data storage unit 204. The interrupt data storage element indicates the type of interrupt that has been asserted by the network peripheral 200.

If a reception interrupt has occurred, the ISR instructs the host processor unit 207 to enter routine 315 and start an execution timer. Next, the ISR instructs the host processor unit 207 to execute a receive routine 312. In the receive routine 312, the host processor unit 207 is instructed to perform all the processing that is necessary for the incoming information packet 220. This processing includes assisting in the transfer of the incoming packet 220 from the data storage unit 204 to the host RAM 208. Once the receive routine 312 in completed, the ISR instructs the host processor unit to stop the execution timer, read the execution timer's value, and clear the execution timer in routine 316. The execution timer may be implemented in either hardware or software.

After retrieving the value in the execution timer in routine 316, the host processor unit 207 is instructed to convert the execution timer's value into an execution time byte value, which is an approximation of the combined number of bytes in the SU and COPY sections of the incoming information packet 220. In accordance with the present invention, the host processor unit 207 performs the conversion according to the following equation:

$$ETBV=ET*(R_T\div R_N) \qquad (1)$$

wherein:

ETBV is the execution time byte value;

ET is the value retrieved from the execution timer;

$R_N$ is the time required for transferring a byte on the communications network 214, which is equal to the inverse of the byte data transfer rate of the communications network 214; and $R_T$ is the time between each increment of the execution timer.

For example, if the communication network has a byte data transfer rate of 10 Megabits per second, then $R_N$ is equal to the inverse of 1.25 Megabytes per second. Accordingly, $R_N$ is equal to 800 nanoseconds.

After the receive routine 316 is completed, the host processor unit 207 is then instructed to return to state 311 to determine if any more processing is required by the network peripheral 200. If in routine 311 the host processor unit 207 detects that reception processing is not required and an alternate type of processing is required 200, the ISR instructs the host processor unit 207 to perform the appropriate operations in a set of transmission and management routines 313. After completing the appropriate operations in the transmission and management routines 313, the host processor unit 207 is instructed to return to routine 311 and determine if more processing is necessary.

If in the interrupt monitoring routine 311 the host processor unit 207 determines that all processing required by the network peripheral 200 is complete, the ISR instructs the host processor unit 207 to execute a segment 2 load routine 337. The instructions in the segment 2 load routine 337 direct the host processor unit 207 to calculate and load a single segment 2 value into the segment 2 value data storage element 245 (FIG. 8).

The ISR instructs the host processor unit 207 to calculate the segment 2 value by employing the following equation:

$$S2V=LV+ETBV \qquad (2)$$

wherein:

S2V is the segment 2 value;

LV is the latency value number of bytes determined in the latency calculation routine 310; and ETBV is the execution time byte value determined in routine 316.

The host processor unit 207 loads the result of this a calculation into the segment 2 value data storage element 245.

Once the segment 2 load routine 337 is completed, the ISR instructs the host processor unit 207 to restore the host system to the state it was in before entering the ISR, exit the ISR and return to the operations it was performing before entering the ISR.

In an alternate embodiment of the present invention, a segment 2 value may be calculated in the ISR's segment 2 load routine 337 (FIG. 10) to account for an average segment 2 value from several packets. In one such embodiment, the execution time byte value (ETBV) is calculated differently. The stop and read execution timer routine 316 is modified so that the execution timer is stopped every time routine 316 is entered, but the timer is not cleared or read every time. Instead, the execution timer is only read or cleared after routine 316 is entered each N number of times, wherein N is an integer. On each Nth time that routine 316 is entered, the execution timer is read and cleared, and an execution time byte value is calculated according to the following equation:

$$ETBV=ET*(R_T\div R_N)\div N \qquad (3)$$

wherein:

N is the number of times that routine 316 has been entered, since an ETBV was last calculated.

The execution time byte value calculated according to equation 3 can then be employed in the segment 2 load routine 337 to calculate a segment 2 value. In order to account for an average segment 2 value, a latency value is obtained in step 310, as described above, based on an average value for the host system's interrupt latency. In routine 337, the latency value based on an average latency time is added to the execution time byte value calculated using equation 3 to obtain the desired average segment 2 value. This segment 2 value is then loaded into the segment 2 value data storage element 245. Since an average segment 2 value is being calculated, routine 337 only needs to recalculate such a value whenever a new executive time byte value is generated.

b. Employing a Segment 1 Value

In another embodiment of the present invention, the reception indicator circuit 211 calculates the approximate instance at which Segment 1 ends and Segment 2 begins (FIG. 6) in an incoming information packet. With reference to FIG. 6, information packet 220 can be described in terms of time as follows:

$$t_{SEG1}=t_{PKT}-t_{IL}-t_{SU}-t_{COPY} \qquad (4)$$

wherein:

$t_{SEG1}$ is the interrupt time (the time required for the network peripheral 200 to receive Segment 1);

$t_{PKT}$ is the time required for the network peripheral 200 to receive the entire information packet 220;

$t_{IL}$ is the time of the host system's interrupt latency, identified by the IL component;

$t_{SU}$ is the time required for any initialization or setup functions to be performed in the ISR, identified by the SU component; and $t_{COPY}$ is the time required for transferring the incoming information packet 220 from the network peripheral 200 to the host RAM, identified by the COPY component.

Equation 5 can be re-written as follows:

$$t_{SEG1}=R_N*(PACKET\_SIZE)-(t_{IL}+t_{SU})-R_C*(PACKET\_SIZE) \quad (5)$$

$$t_{SEG1}=((PACKET\_SIZE)*(R_N-R_C))-(t_{IL}+t_{SU}) \quad (6)$$

wherein:
$R_C$ is a byte copy rate, which is the time required to transfer a single byte from the network peripheral 200 to the host RAM 208.

$R_N$ is the time required for transferring a byte on the communications network 214, which is equal to the inverse of the byte data transfer rate of the communications network 214; and PACKET_SIZE is the number of bytes in the incoming information packet 220.

PACKET_SIZE may be expressed in terms of the following equation:

$$PACKET\_SIZE = LENGTH + HEADER + FCS \quad (7)$$

wherein LENGTH is the length value for the incoming information packet 220.

Consequently, the time at which the interrupt for the incoming information packet 220 should be asserted ($t_{SEG1}$) can be expressed as follows:

$$t_{SEG1}=A*(PACKET\_SIZE)-B \quad (8)$$

wherein:
A is an interrupt time coefficient equal to $R_{N-RC}$; and
B is an interrupt time constant equal to $(t_{IL}+t_{SU})$.

Figure 12:
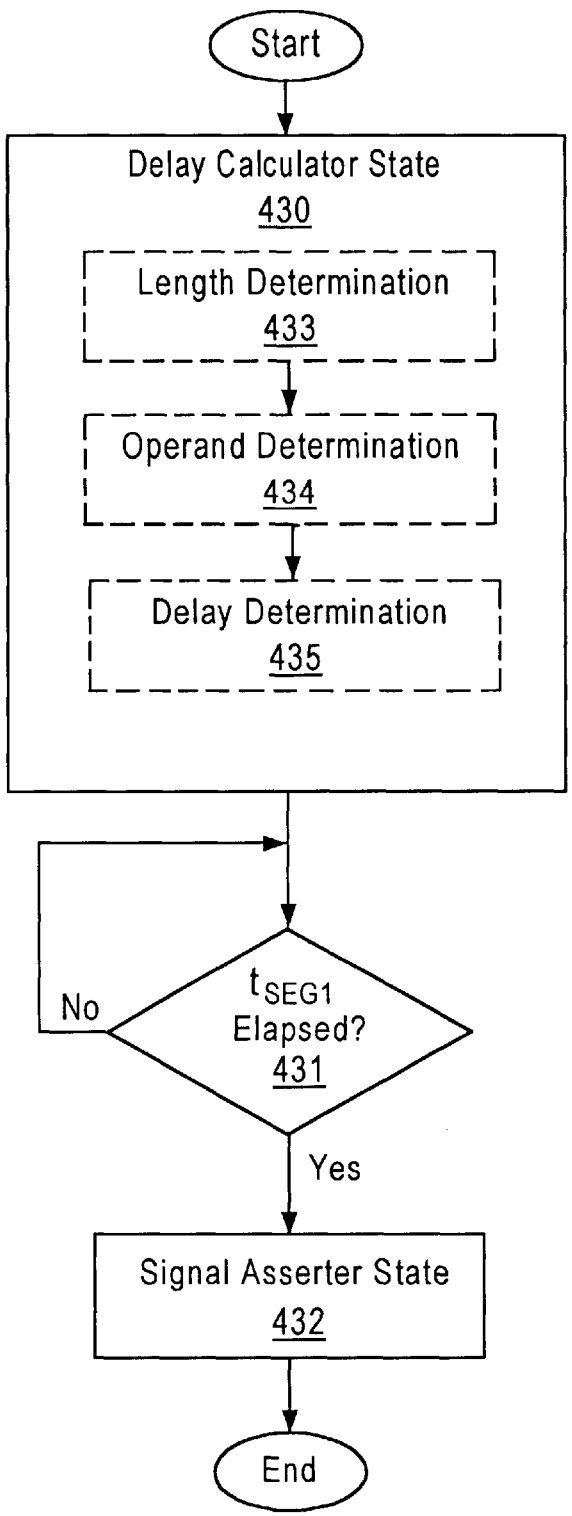
FIG. 12 shows a sequence of operations for the reception indicator circuit in an alternate embodiment of the present invention.

In accordance with the present invention, the reception indicator circuit 211 obtains A, B, and the length value, as inputs. Each of these values may be retrieved from data storage locations on the network peripheral 200. The reception indicator circuit 211 then provides the reception signal to the host system interface 205 at time $t_{SEG1}$. FIG. 12 illustrates a sequence of operations for such a reception indicator circuit 211.

In a delay calculator state 430 (FIG. 12), the reception indicator circuit 211 performs a length determination step 433, which is the same as the length determination step 333 illustrated in FIG. 7. Once the length value is retrieved, the reception indicator circuit 211 enters an operand determination step 434 to retrieve values for A and B. The values for A and B may be stored in the data storage unit 204 (FIG. 4), so that the reception indicator circuit 211 can retrieve them through the MMU 203.

Once the length value, interrupt time coefficient (A), and interrupt time constant (B) have been retrieved, the reception indicator circuit 211 enters a delay determination step 435 to calculate a value for $t_{SEG1}$. The value for $t_{SEG1}$ is determined by having circuitry perform the operation specified in equation 8.

After obtaining the value for $t_{SEG1}$, the reception indicator circuit 211 transitions to a delay comparator state 431 (FIG. 12). In the delay comparator state 431, the reception indicator circuit 211 determines whether the time interval of $t_{SEG1}$ has elapsed from the time that the network peripheral 200 began receiving the first byte of the incoming information packet 220.

The reception indicator circuit 211 is able to determine when the network peripheral 220 begins receiving the incoming information 220 packet through its connection to the data link controller 202. Once it is determined that $t_{SEG1}$ has elapsed, the reception indicator circuit 211 transitions to a signal asserter state 432, which operates the same as the signal asserter state 332 in FIG. 7. In an alternate embodiment of the present invention the reception indicator does not transition from the delay comparator state 431 to the signal asserter state 432 until $t_{SEG1}$ has elapsed and the minimum value number of bytes of the incoming information packet 220 have been received.

The values for the interrupt time coefficient (A) and interrupt time constant (B) may be calculated in software that works in cooperation with the network peripheral 200. In accordance with the present invention, the coefficient A may be calculated in an initialization routine that resides in either the host RAM 208, host ROM 210, host mass storage unit 209, or a portable medium that can be read by the host mass storage unit 209. The B value may be determined in the ISR for the network peripheral.

Figure 13:
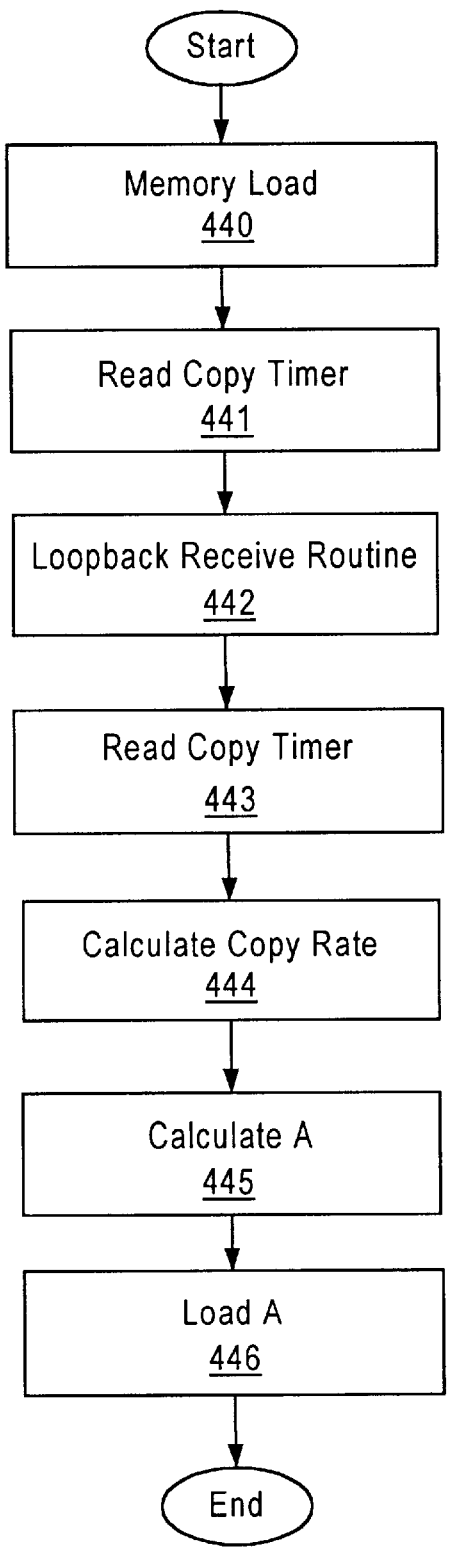
FIG. 13 shows steps executed for determining an interrupt time coefficient value in accordance with the present invention.

FIG. 13 shows a sequence of operations for calculating coefficient A. In a memory load step 440, the host processor unit 207 is instructed to load data into the data storage unit 204 (FIG. 4). This may be performed by the processor unit 207 instructing the network peripheral 200 to perform an internal loopback operation. During the internal loopback operation, the network peripheral 220 begins operating as it would to perform the transmission of an information packet. Data from the host RAM 208 is transferred to the data link controller 202. However, instead of transferring the data onto the communications network, the data link controller 202 merely buffers the data to the data storage unit 204 through the MMU 203.

Once this operation is complete, the host processor unit reads a copy timer (not shown) in step 441 (FIG. 13). In accordance with the present invention, the copy timer may be a free running counter that counts at a clock rate, which is equal to the rate at which bytes are transferred on the communications network 214. The copy timer may be maintained in either the network peripheral 200, the processor unit 207, or software.

After reading the timer, the host processor unit executes a loopback receive routine 442 to transfer the data from the data storage unit 204 to the host RAM 208. The loopback receive routine is the same receive routine 312 that is executed in the ISR and may perform either programmed I/O or DMA data transfers. Once the receive routine is complete, the processor unit 207 reads the copy timer in step 443. After reading the copy timer (step 443), the host processor unit 207 is instructed to calculate a copy rate in step 444. The copy rate indicates the time required to transfer one byte of data from the network peripheral 200 to the host RAM 208. This may be achieved by performing the following operation:

$$R_C=(T_2-T_1)\div BYTES \quad (9)$$

wherein:
$R_C$ is the byte copy rate;
$T_2$ is the value obtained from the second reading of the copy timer;
$T_1$ is the value obtained from the first reading of the copy timer; and
BYTES is the number of bytes transferred from the network peripherals 200 to the host system in the loopback receive routine 442.

In an alternate embodiment of the present invention, the copy timer may count at a different rate than the byte transfer rate of the communications network 214. In such a case, the values that are retrieved from the copy timer are converted to indicate the number of network byte times that elapsed during the retrieved counting values. The converted values are then employed as $T_1$ and $T_2$ in equation 9.

Once $R_C$ is calculated, the host processor unit 207 calculates a value for A in step 445. In accordance with the present invention, the value for A may be calculated by performing the following operation:

$$A = R_N - R_C \tag{10}$$

After calculating the value A, the processor unit 207 executes a load A step 446, in which the value A is loaded into a data storage location on the network peripheral 200. The data storage location for the value A may reside in either the data storage unit 204, reception indicator circuit 211, or other suitable location on the network peripheral 200.

Figure 14:
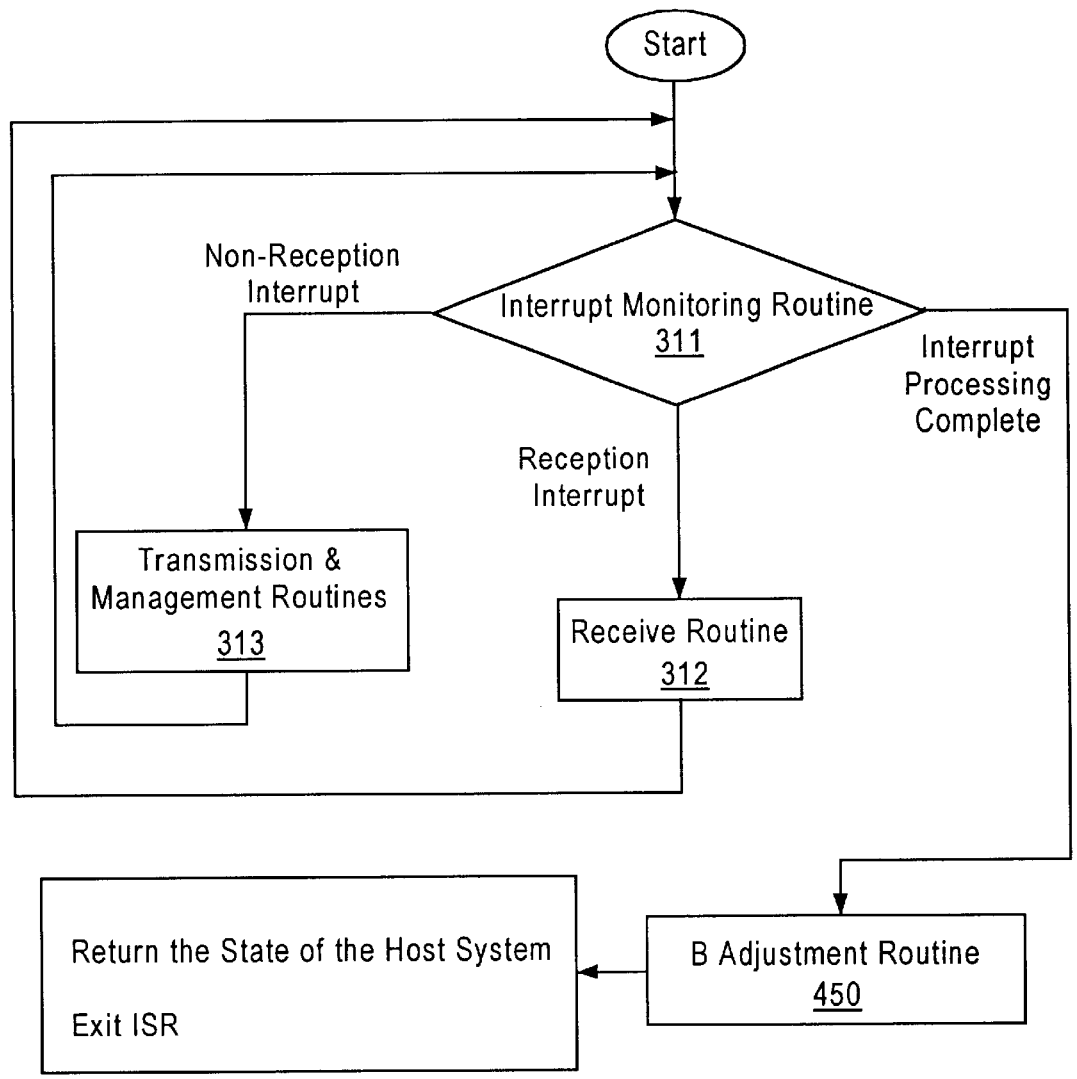
FIG. 14 shows steps executed in an interrupt service routine for processing and receiving an information packet in an alternate embodiment of the present invention.

FIG. 14 illustrates an ISR that may be used in conjunction with the network peripheral 200 for calculating a value for B. The ISR in FIG. 14 is substantially the same as the ISR in FIG. 10, with the following exceptions:

1. The Latency Calculation Routine 310, Begin Execution Timer Routine 315 and Stop and Read Execution Timer Routine 316 have all been removed;
2. The Latency Load Routine 317 is replaced by a B Adjustment Routine 450; and
3. The interrupt monitoring routine 311 performs the additional function of disabling host system interrupts and having the network peripheral 200 deassert its interrupt signal, when routine 311 is executed for the first time.

Figure 15:
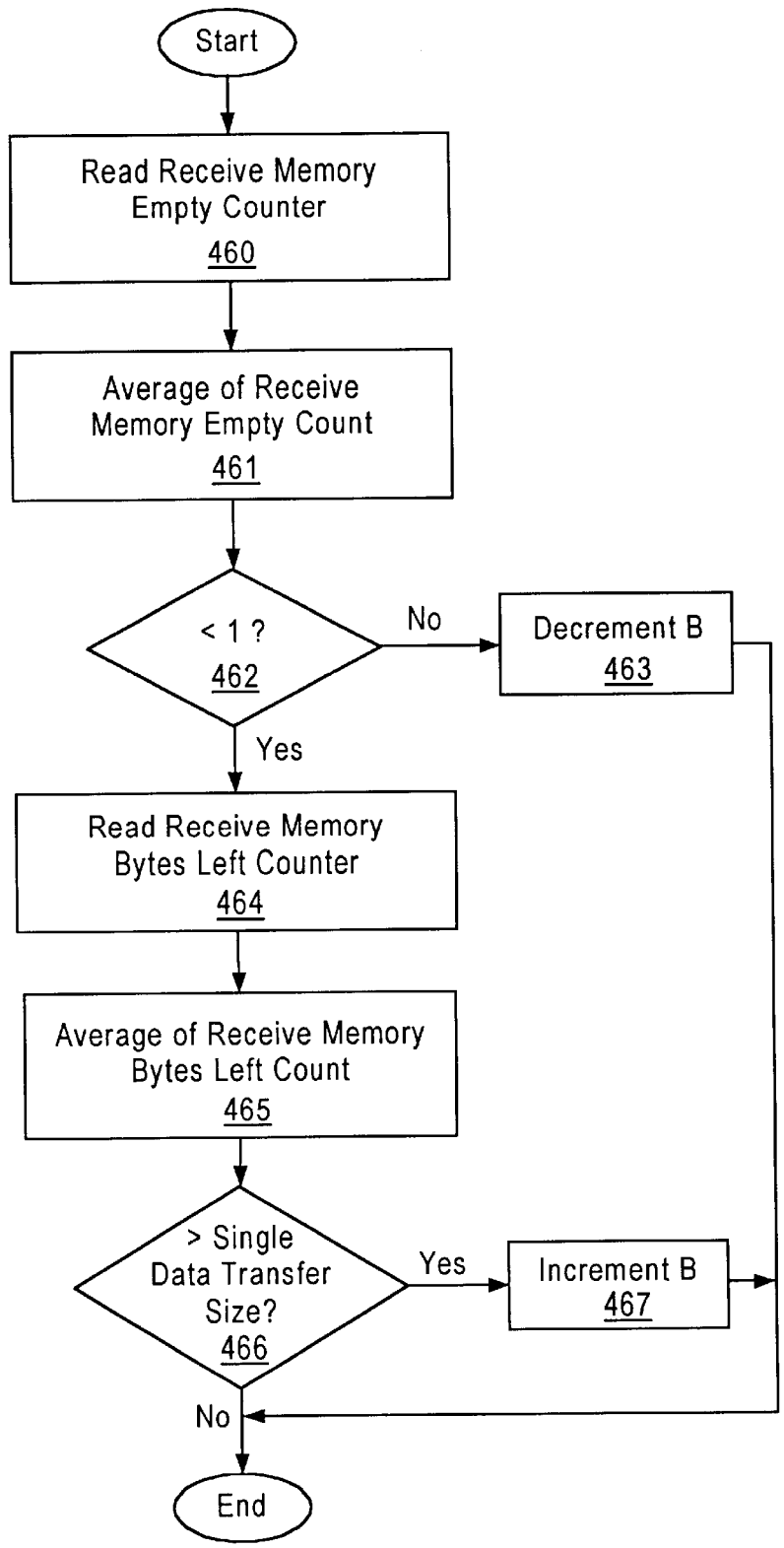
FIG. 15 shows steps executed for adjusting an interrupt time constant in accordance with the present invention.

All the remaining routines operate the same as the equivalently numbered routines in FIG. 10. FIG. 15 shows a sequence of operations for the B Adjustment Routine 450, which provides for adjusting the value of B. When the network peripheral first begins to operate, B may be set to a default value, such as one half of the time required to transmit a packet with a maximum allowable number of bytes on the communications network 214.

In the data storage unit 204 (FIG. 4), the network peripheral 200 has a designated receive memory location (not shown) for buffering an incoming information packet. In accordance with the present invention, this location may be a FIFO (First In-First Out) memory. A receive memory empty counter (not shown) indicates the number of times that the designated receive memory location was emptied during the reception of an incoming information packet 220. In accordance with the present invention, the receive memory empty counter may be maintained in the data storage unit 204. In step 460 (FIG. 15), the processor unit 207 is instructed to read the receive memory empty counter.

In step 461, the processor unit 207 averages the value retrieved in step 460 with values that it previously obtained from reading the receive memory empty counter. The average may be obtained by summing a set of values retrieved from the receive memory empty counter and dividing the sum by the number of values that have been summed. Alternatively, a weighted average may be obtained to give greater weight to the most frequently occurring retrieved values. In step 462, the processor unit 207 determines whether the average value of the receive memory empty counter readings is less than 1. If the average value is greater than or equal to 1, the host processor unit 207 decrements B in step 463 and writes the new B value to a data storage location for B in the network peripheral 200. In accordance with the present invention, B may be decremented by 10%. In an alternate embodiment of the present invention, B may be decremented by a fixed amount, such as 2% of the time required to transmit a maximum length packet on the communications network 214. After decrementing B, the processor unit exits the ISR in the manner described for the ISR illustrated in FIG. 10.

As a result of decrementing B, the reception interrupt will be issued at a later time, since $t_{SEG1}$ will be increased. Accordingly, the processor unit will be less likely to empty the entire designated receive memory during the reception of the incoming information packet 220. This is beneficial, because it reduces the likelihood of the processor unit 207 sitting idle in the ISR.

If the average value is less than 1 in step 462, the processor unit 207 begins executing step 464, in which the value in a receive memory bytes left counter (not shown) is read. The receive memory bytes left counter indicates the number of bytes left in the designated receive memory when the last byte of the incoming information packet 220 is received. In accordance with the present invention, the receive memory bytes left counter may be maintained in the data storage unit 204 (FIG. 4).

In step 465, the processor unit 207 averages the value retrieved in step 464 with values that it previously obtained from reading the receive memory bytes left counter. This average may be taken in the same manner as described above for the receive memory empty count values. In step 466, the processor unit 207 determines whether the average value of the receive memory bytes left count is greater than the number of bytes transferred from the network peripheral 200 to the host RAM 208 in a single data transfer operation. If the average receive memory bytes left count is less than or equal to the data transfer size, the processor unit 207 exits the ISR. If the average value is greater than the data transfer size, the host processor unit increments B in step 467 and writes the new B value to the data storage location for B in the network peripheral 200. In accordance with the present invention, B may be incremented by 10%. In an alternate embodiment of the present invention, B may be incremented by a fixed amount, such as 2% of the time required to transmit a maximum length packet on the communications network 214. The processor unit then exits the ISR in the manner described for the ISR illustrated in FIG. 10.

As a result of incrementing B, the reception interrupt will be issued at an earlier time, since $t_{SEG1}$ will be decreased. Accordingly, the processor unit will be less likely to remain in the ISR after the completion of the network peripheral's reception of the incoming information packet. This is beneficial, because it makes the processor 207 available more rapidly to service demands from higher levels of the network operating system.

c. Employing a Big and Small Packet Distinction

Figure 16:
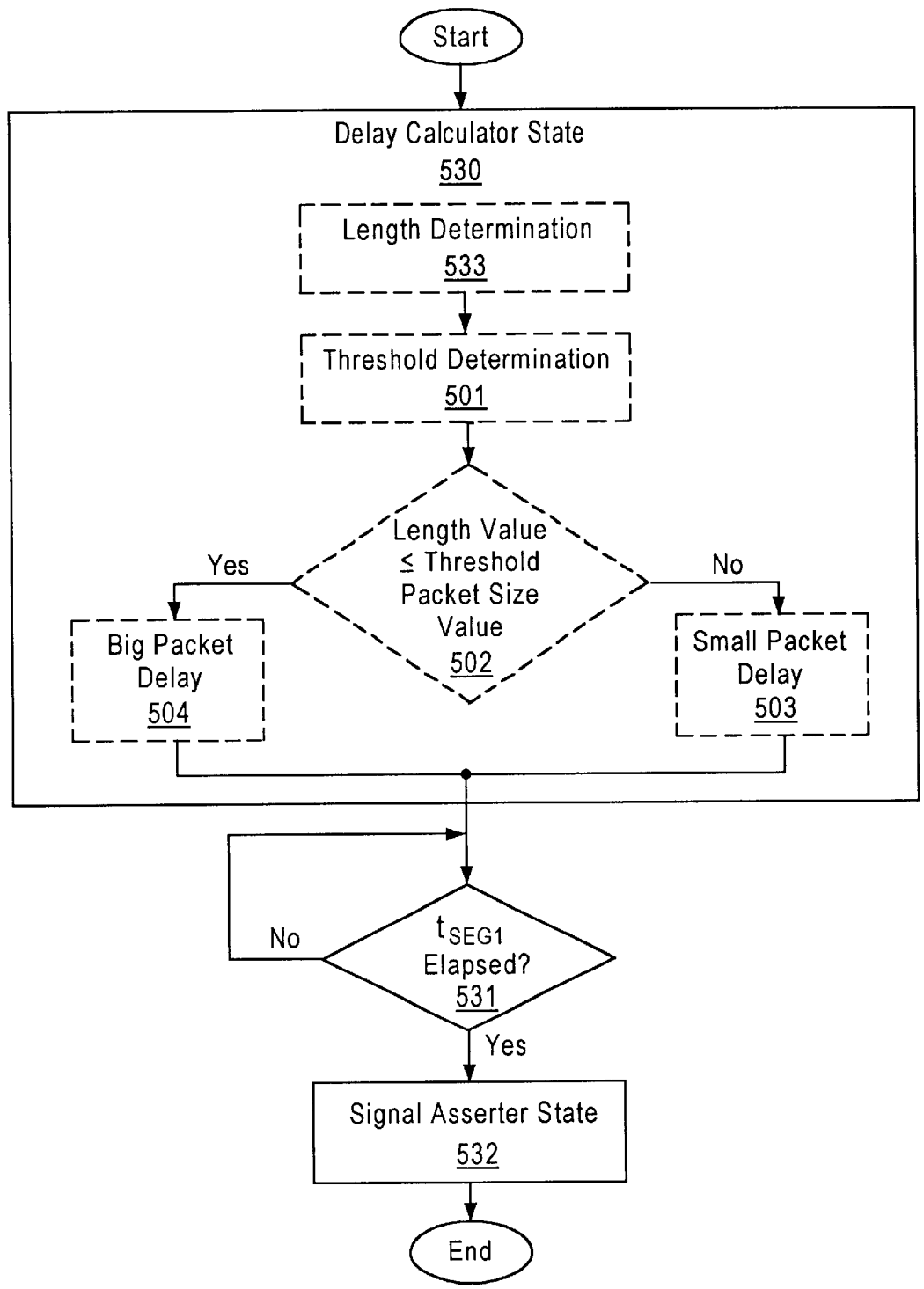
FIG. 16 shows a sequence of operations for the reception indicator circuit in an alternate embodiment of the present invention.

FIG. 16 shows another embodiment of the reception indicator circuit 211 in accordance with the present invention. This embodiment provides for determining whether an incoming information packet 220 is a "big" packet or a "small" packet and generating the interrupt accordingly. On communications networks, empirical data shows that information packets typically contain either a small number of bytes or the maximum number of bytes allowable by the communications network standard. Approximately 100 bytes is considered to be a small number of bytes in a packet. Therefore, it is beneficial to provide a reception interrupt at either a time that is best for a "small" packet, having for example a number of bytes in the range of 0 to 200 bytes, or another time that is best for a "big" maximum size packet.

In a delay calculator state 530 (FIG. 16) for such a reception indicator circuit 211, the reception indicator circuit 211 first executes a length determination step 533. In the length determination step 533, the reception indicator 211 retrieves a length value for an incoming information packet. As previously described for step 333 in FIG. 7, this value may be determined by the operation of the length finder circuit 213 (FIG. 4). Next in a threshold determination step 501, the reception indicator circuit 211 retrieves a threshold packet size value, which may be stored in the data storage unit 204 or another suitable data storage location in the network peripheral 200. The threshold packet size value indicates the maximum size for a "small" packet. In one embodiment of the present invention, the threshold packet size value may be 300 bytes.

After retrieving the threshold packet size value, the reception indicator circuit 211 compares the length value to the threshold packet size value in step 502. If the length value is equal to or less than the threshold packet size value, the reception indicator circuit 211 transitions to a small packet delay step 503. In the small packet delay step 503, the value for the interrupt time ($t_{SEG1}$) is set to the time required for the network peripheral 200 to receive the minimum value number of bytes from the communication network 214.

If the length value exceeds the threshold packet size value, the reception indicator circuit 211 transitions to a big packet delay step 504. In step 504, an interrupt time constant (B), as describe above, is retrieved from a data storage location in the network peripheral and assigned to $t_{SEG1}$. In this embodiment of the present invention, B indicates the time period that should elapse from the moment that the network peripheral 200 begins receiving the incoming information packet 220 until the moment that the reception interrupt is generated. In accordance with the present invention, B is adjusted in the ISR for the network peripheral 200, as described above and illustrated with reference to FIG. 14. A default starting value for B may be equal to the time required to receive a packet that has half of the maximum number of bytes allowable by the communications network's 214 standard.

Once a value for $t_{SEG1}$ is obtained in either step 503 or step 504, the reception indicator circuit 211 transitions to a delay comparator state 531 that operates the same as the delay comparator state 431 illustrated in FIG. 12. In state 531, the late reception indicator 211 determines when $t_{SEG1}$ has elapsed from the time that the network peripheral's reception of the incoming packet began. Once $t_{SEG1}$, has elapsed, the reception indicator circuit 211 transitions to the signal asserter state 532, which operates the same as the signal asserter state 332 illustrated in FIG. 7.

d. Employing Length-Delay Data Storage Elements

Figure 17:
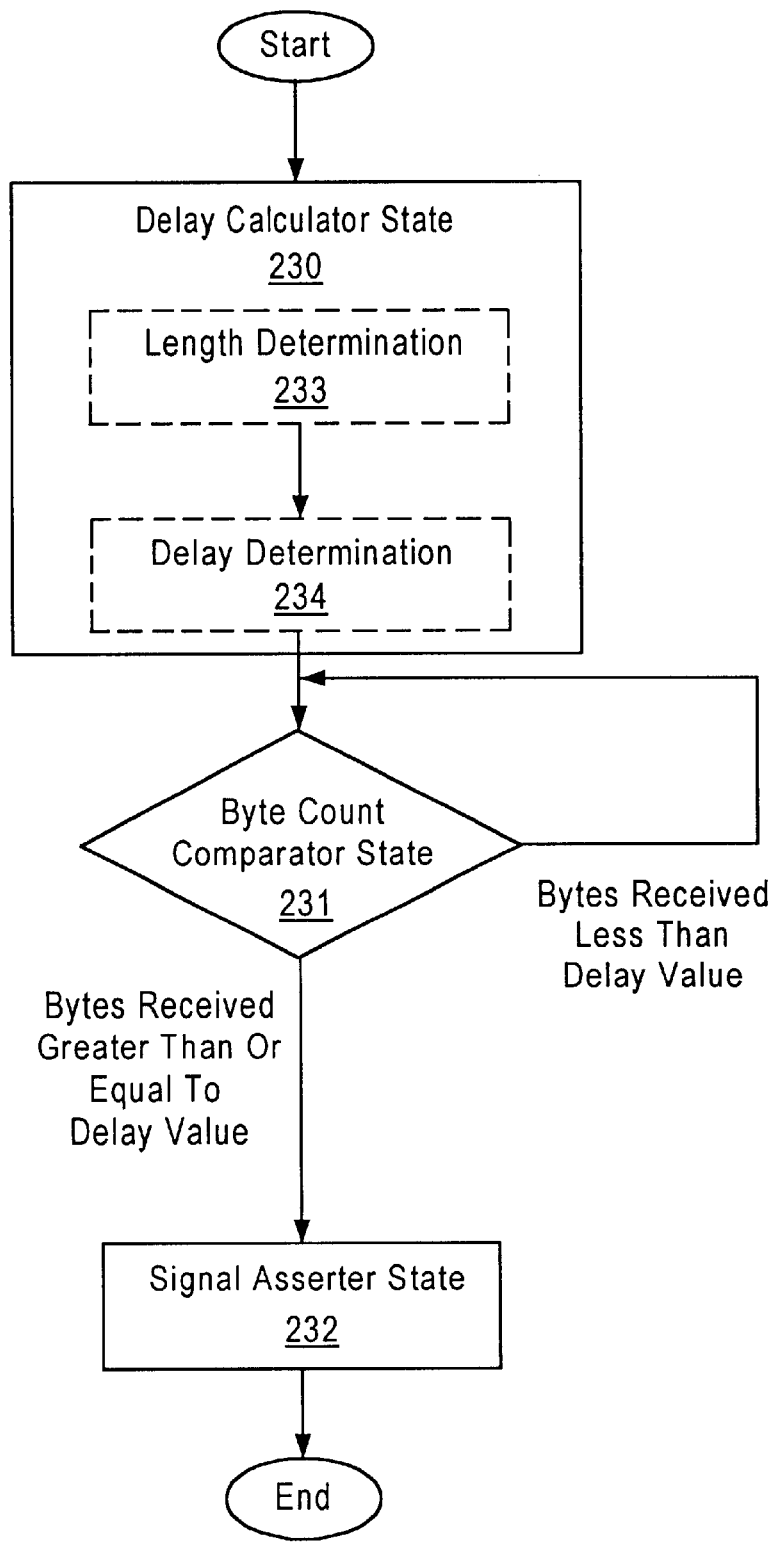
FIG. 17 shows a sequence of operations for the reception indicator circuit in an alternate embodiment of the present invention.

FIG. 17 illustrates a sequence of operations performed by the reception indicator circuit 211 (FIG. 4) in an alternate embodiment of the present invention. In this embodiment, a look-up table is employed to determine the delay to wait from the beginning of a packet before indicating that a reception interrupt is to be asserted. As in the reception indicator circuit 211 embodiment that was described with reference to FIGS. 7–11 (Employing a Segment 2 Value), the first state entered by the reception indicator 211 is a delay calculator state 230 (FIG. 17). In the delay calculator state 230, a length determination 233 is performed for an incoming information packet 220 (FIG. 6). The length determination step 233 is the same as the length determination step 333 described with reference to FIG. 7. As a result, a length value for the incoming information packet 220 is retrieved from a data storage element.

Once the length value is retrieved, the reception indicator circuit 211 remains in the delay calculator state 230 and performs a delay determination step 234. In the delay determination step 234, the reception indicator circuit 211 determines a delay value, which is approximately equal to the number of bytes in Segment 1 (FIG. 6) of the incoming information packet 220.

Figure 18:
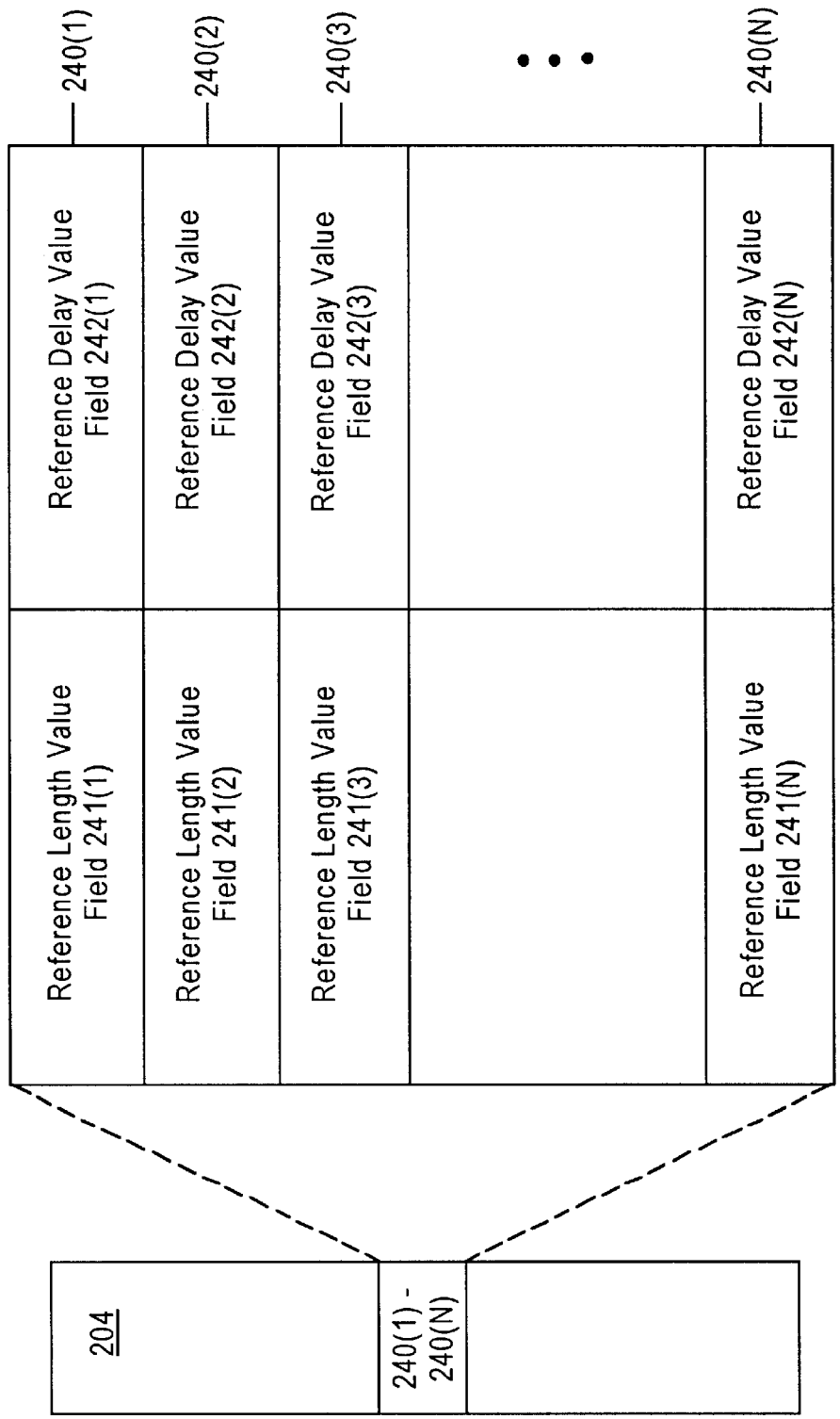
FIG. 18 shows a set of length-delay data storage elements in accordance with the present invention.

In order to determine the delay value, the reception indicator circuit 211 references a set of length-delay data storage elements. FIG. 18 shows a set of N number of length-delay data storage elements 240(1)–240(N) that reside in the data storage unit 204. Each length-delay data storage element 240(1)–240(N) can be accessed by the reception indicator circuit 211 through the MMU 203, as well as by the host processor unit 207 through the host system interface 205 in combination with the MMU 203.

In one embodiment of the present invention, each length-delay data storage element 240(1)–240(N) is a single data storage element having one address. In an alternate embodiment of the present invention, each length-delay storage element 240(1)–240(N) may have a plurality of addresses, with each address corresponding to a different portion of the length-delay data storage element 240. In yet another embodiment of the present invention, each length-delay data storage element 240(1)–240(N) may consist of a plurality of storage elements that each contain a different portion of the data in the length-delay data storage element 240. For example, each length delay data storage element 240(1)–240(N) may consist of two registers having different addresses.

Each length-delay data storage element 240(l)–240(N) contains a reference length value field 241 and a reference delay value field 242. Each reference length value field 241(l)–241(N) contains a reference length value. Each reference delay value field 242(l)–242(N) contains a reference delay value. Each reference delay value is equal to the number of bytes in Segment 1 of an information packet that has a length value equal to the reference length value in a respective reference length value field 241(1)–241(N). For example, a reference delay value in the first reference delay value field 242(1) is substantially equal to the number of Segment 1 bytes in an information packet having a length value that is equal to the reference length value in the first reference length value field 241(1).

In the delay determination step 234, the reception indicator circuit 211 selects a length-delay data storage element 240, which contains a reference length value that corresponds to the length value of the incoming information packet 220. A reference length value corresponds to the length value when it is the one of the N number of reference length values that most closely matches the length value. The reference delay value in the selected length-delay data storage element 240 is then retrieved by the reception indicator circuit 211 and used as the delay value for the incoming information packet 220.

Once the delay value is determined, the reception indicator circuit 211 enters the byte count comparator state 231. In this state 231 the reception indicator circuit 211 monitors the number of bytes of the incoming information packet 220 that are received by the network peripheral 200. The reception indicator circuit 211 performs this monitoring through its link to the data link controller 202. In one embodiment of the present invention, once the network peripheral 200 receives the delay value number of bytes of the incoming information packet 220, the reception indicator circuit 211 transitions to a signal asserter state 232.

Figure 19:
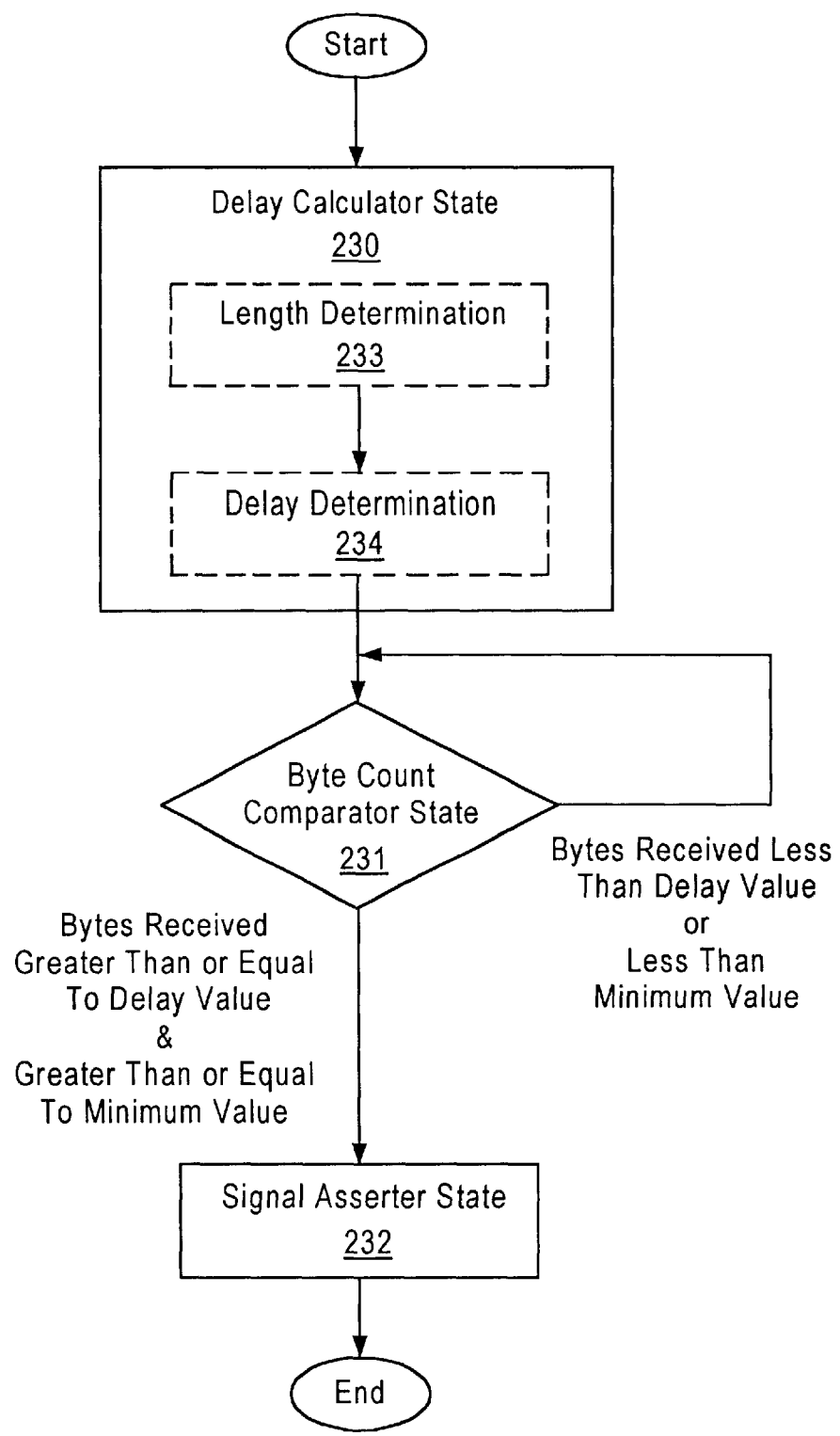
FIG. 19 shows a sequence of operations for the reception indicator circuit in an alternate embodiment of the present invention.

In an alternate embodiment of the present invention, as shown in FIG. 19, once the network peripheral 200 receives both the delay value and a minimum value number of bytes of the incoming information packet 220, the reception indicator circuit 211 transitions to the signal asserter state 232. The minimum value number of bytes is the number of bytes of an incoming information packet that must be received to indicate that the incoming packet 220 is not merely a fragment of a packet. In the IEEE 802.3 standard and DIX Ethernet standard the minimum value is 64 bytes.

In the signal asserter state 232, the reception signal is asserted and provided to the host system interface 205. As a result, the host system interface 205 generates an interrupt that is provided to the host processor unit 207.

Figure 20:
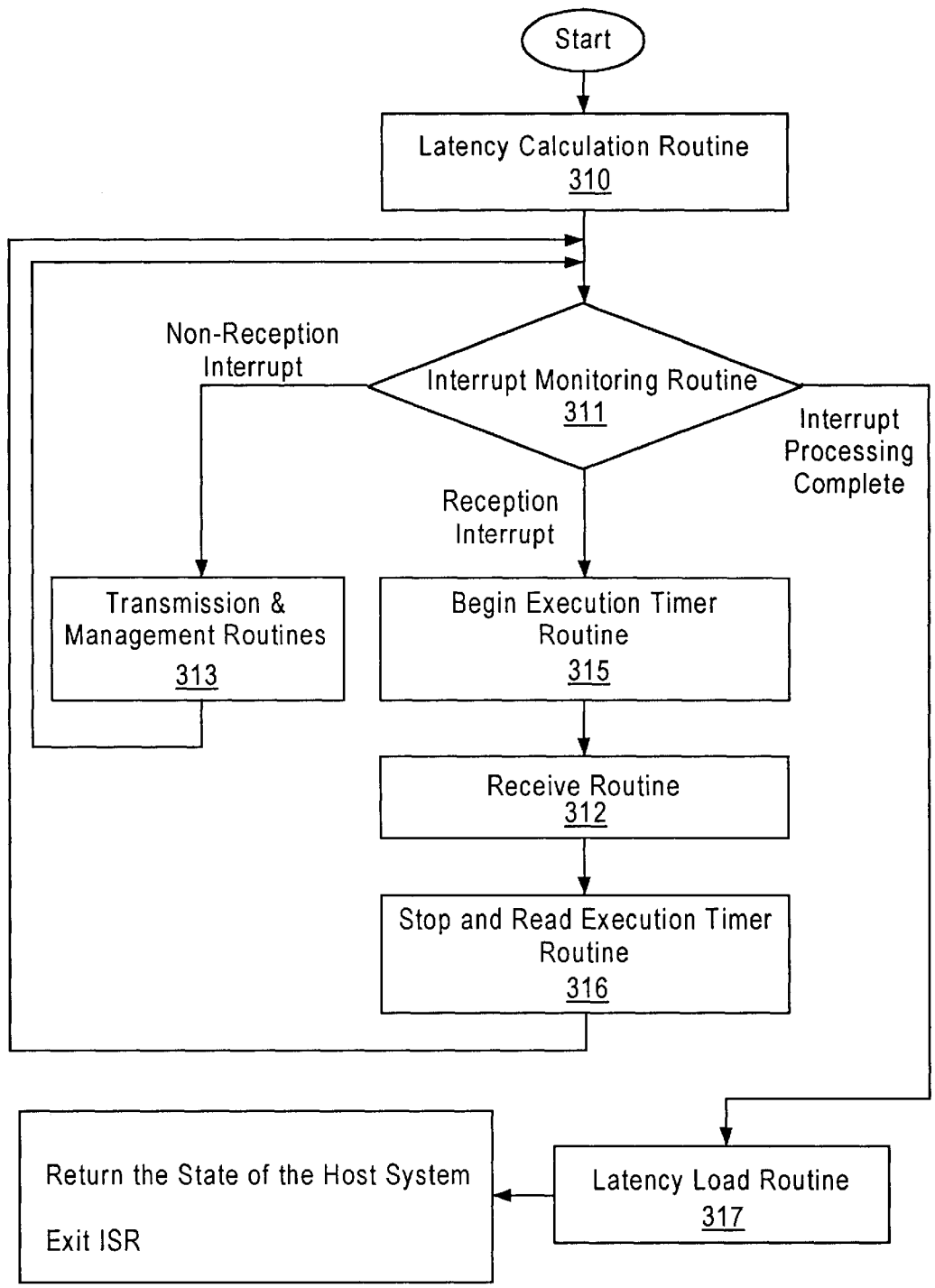
FIG. 20 shows steps executed in an interrupt service routine for processing and receiving an information packet in an alternate embodiment of the present invention.

FIG. 20 shows the sequence of operations for an ISR that may be employed with a network peripheral 200 that includes a reception indicator circuit 211 as described with reference to FIGS. 17–19. The ISR shown in FIG. 20 is the same as the ISR shown in FIG. 10 with one modification. The segment 2 load routine 337 is replaced by a latency load routine 317. The instructions in the latency load routine 317 direct the host processor unit 207 to calculate and load reference delay values into the length-delay data storage elements 240(1)–240(N) (FIG. 18).

For each of the N number of length-delay data storage elements 240(1)–240(N), the ISR instructs the host processor unit 207 to perform the following operations. First, the host processor unit 207 retrieves a reference length value in a reference length value field 241 (n). This value can be retrieved from the length-delay data storage element 240(n) or a copy of the contents of the length-delay storage element that is maintained in host RAM 208. Next, the host processor unit 207 calculates the reference delay value by employing the following equation:

$$RDV(n)=PACKET\_SIZE(n)-(LV+ETBV) \quad (11)$$

wherein:
- RDV(n) is the nth reference delay value;
- LV is the latency value number of bytes;
- PACKET_SIZE (n) is the number of bytes in an information packet having a length value equal to the nth reference length value; and
- ETBV is the execution time byte value determined in routine 316.

The host processor unit 207 loads the result of this calculation into the length-delay data storage element 240(n) for later use as a reference delay value in the reference delay value field 242(n).

The value for PACKET_SIZE(n) may be determined according to the following operation:

$$PACKET\_SIZE(n)=RLV(n)+HEADER+FCS \quad (12)$$

wherein:
- RLV(n) is the nth reference length value;
- HEADER is the number of bytes in an information packet that precedes the data field; and
- FCS is the number of bytes in an FCS field in an information packet.

The value for ETBV may be calculated as described above according to either equation 1 or equation 3. When equation 3 is employed, the execution time byte value (ETBV) is calculated every Nth time that the stop and read execution timer routine 316 is executed. Similarly, the execution timer is only cleared on every Nth execution of routine 316. Also, when equation 3 is used to obtain ETBV, the latency value number of bytes used in equation 11 may be calculated in routine 310 based on an average latency time value, as described above.

Once the latency load routine 314 is completed, the ISR instructs the host processor unit 207 to restore the host system to the state it was in before entering the ISR, exit the ISR, and return to the operations it was performing before entering the ISR.

In an alternative embodiment of the present invention, the reference delay values may be calculated and accumulated each time the ISR is executed. Each accumulated reference value could then be averaged and loaded into the length-delay storage elements 240(1)–240(N) after the ISR is executed a predetermined number of times.

In yet another embodiment of the present invention, the reference delay values may only be calculated and loaded every Nth time that the latency load routine 317 is executed. In such an embodiment, ETBV is calculated according to equation 3 and an average latency time is used to calculate LV.

4. The Length Finder Circuit

Figure 21:
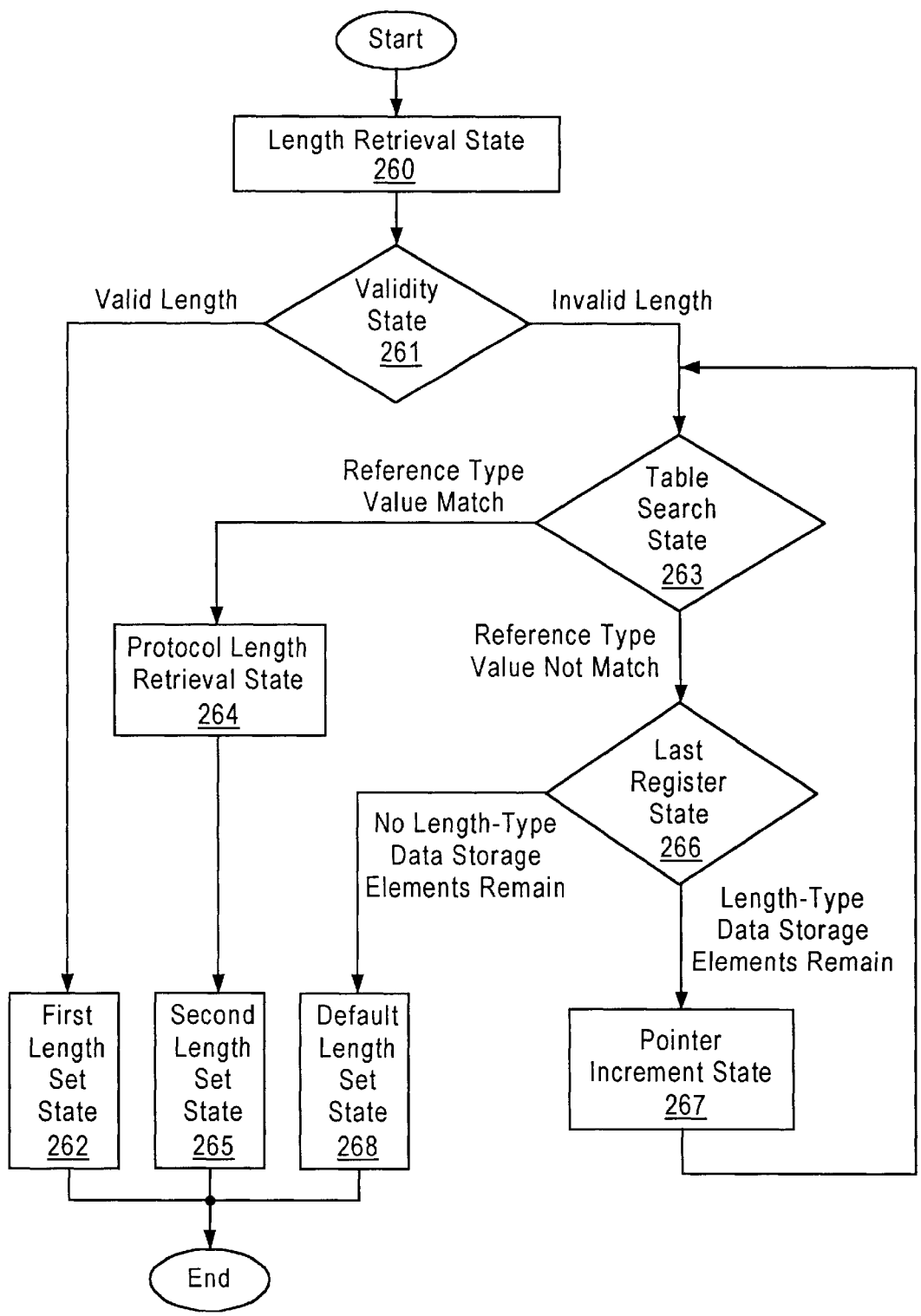
FIG. 21 shows a sequence of operations for the length finder circuit in accordance with the present invention.

The network peripheral's length finder circuit 213 (FIG. 4) locates the appropriate length field in the incoming packet and employs the contents of this field to determine the length value for the incoming information packet 220. The length value is then stored in a data storage location that is accessible by the reception indicator circuit 211. FIG. 21 displays a sequence of operations performed by the length finder circuit 213 in one embodiment of the present invention. One with ordinary skill in the art will recognize that many different circuits may be designed for implementing the sequence of operations shown in FIG. 21 using traditional design principles. In a length retrieval state 260, the length finder circuit 213 retrieves a length-type value from the data link controller 202. The length-type value is the value in the length-type field 224 of the incoming information packet 220 (FIG. 6).

In an alternate embodiment of the present invention, the length-type value may be stored in a data storage element in the data storage unit 204, and the length finder circuit 213 retrieves the length-type value from the length-type data storage element through the MMU 203.

Next, the length finder circuit 213 transitions to a validity state 261, where the length finder circuit 213 determines whether the length-type value is a valid length. In one embodiment of the present invention, the length-type value is compared to a maximum data field value, which is the maximum number of bytes that can be placed in a data field 225 of the information packet 220. If the length-type value is less than or equal to the maximum data field value, it is a valid length, and the length finder circuit 213 transitions to the first length set state 262. If the length-type value is greater than the maximum value, it is an invalid length, and the length finder circuit 213 transitions to the table search state 263. In one embodiment of the present invention, the maximum data field value is 1500, which is the maximum number of bytes that can be in the data field of either an IEEE 802.3 or DIX Ethernet standard information packet.

In the first length set state 262, the length finder circuit 213 loads the length-type value into the data storage element for the length value (not shown). After loading the length-type value, the length-finder circuit 213 generates an indication signal to the reception indicator circuit 211 to indicate that the length value is available to be retrieved.

Figure 22:
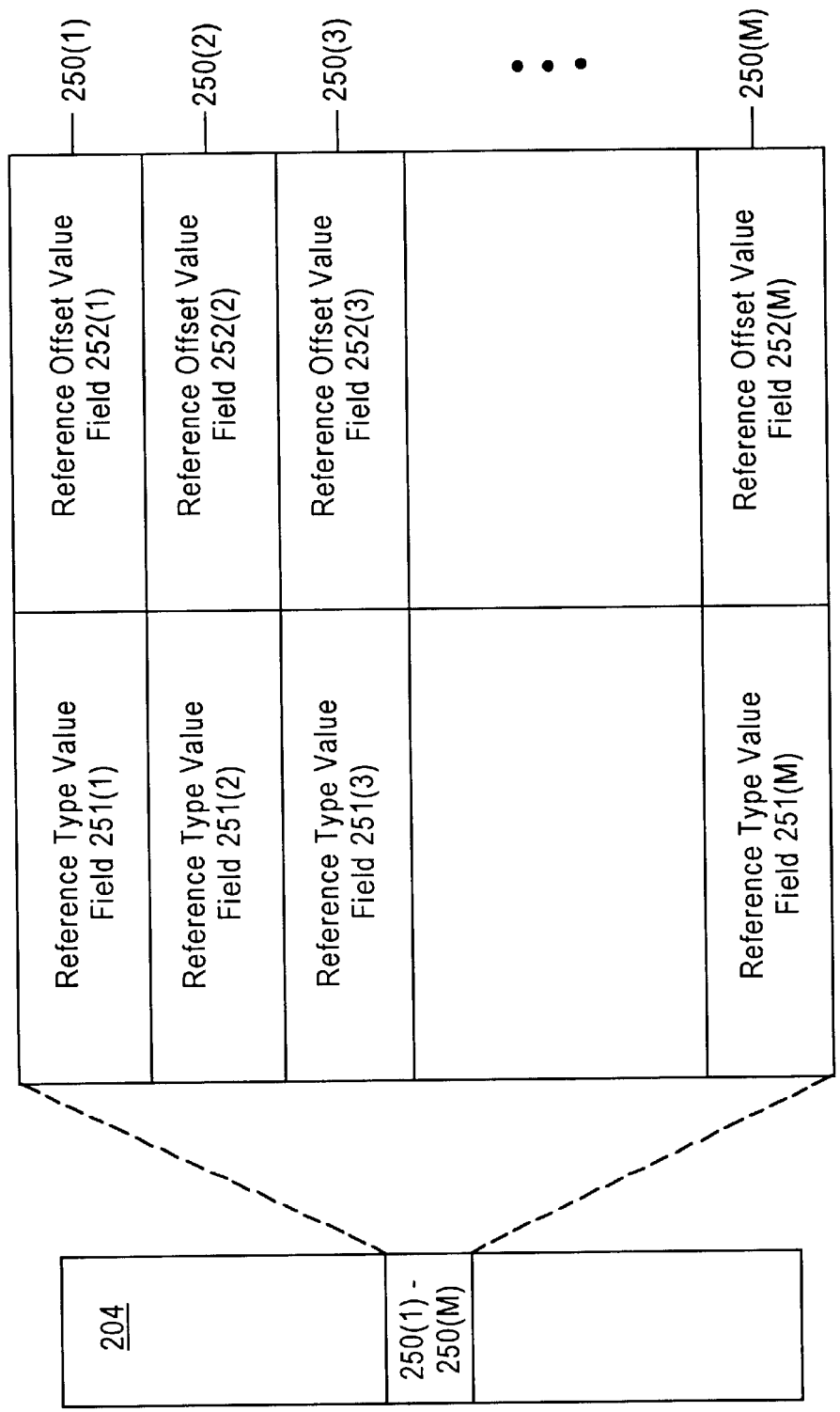
FIG. 22 shows a set of length-type data storage elements in one embodiment of the present invention.

The table search state 263 is the first state in a series of states that operate together to query a set of length-type data storage elements. FIG. 22 displays one embodiment of a set of length-type data storage elements 250(1)–250(M). The set of length-type data storage elements 250(1)–250(M) includes M number of length-type data storage elements 250(1)–250(M), which are located in the data storage unit 204. In accordance with the present invention, the set of length-type data storage elements 250(1)–250(M) may consist of 4 length-type data storage elements 250(1), 250(2), 250(3), and 250(4).

Each length-type data storage element 250(1)–250(M) can have data written into it or read from it. The length finder circuit 213 accesses the length-type data storage elements 250(1)–250(M) through the MMU 203. Each length-type data storage element 250(1)–250(M) contains a reference type value field 251 and a length offset value field 252, which contain a reference type value and a length offset value, respectively.

In one embodiment of the present invention, each length-type data storage element 250(1)–250(M) is a single data storage element having one address. In an alternate embodiment of the present invention, each length-type storage element 250(1)–250(M) may have a plurality of addresses, with each address corresponding to a different portion of the length-type data storage element 250(1)–250(M). In yet another embodiment of the present invention, each length-type data storage element 250(1)–250(M) may consist of a plurality of data storage elements that each contain a different portion of the data in the length-type data storage element 250(1)–250 (M). For example, each length-type data storage element 250(1)–250(M) may consist of two registers having different addresses.

A reference type value and length offset value may be loaded into each length-type data storage element 250(1)–250(M) by the host processor unit 207. The host processor unit 207 loads these values in response to instructions that it receives from an initialization routine. The initialization routine may be resident in the host RAM 208, host ROM 210, host mass storage unit 209, a portable medium readable by the host mass storage unit 209, or another suitable location. The initialization routine may be executed as part of the ISR for the network peripheral 200, a boot-up routine for the host system, or a number of other routines executed by the host system.

The host processor unit 207 accesses the length-type data storage elements 250(1)–250(M) through the host system interface 205, which accesses the data storage unit 204 through the memory management unit 203. Each reference type value is a value that may appear in a length-type field of a future incoming information packet 220 to indicate the network operating system protocol that dictates the format of the packet 220. Each length offset value indicates the number of bytes between the protocol length field 228 and the beginning of an information packet conforming to a respective protocol type.

For example, an incoming information packet 220 has a value in its length-type field 224. This value matches a reference type value in the first reference type value field 251(1). Accordingly, the length offset value in the first length offset value field 252(1) indicates the number of bytes that a protocol length field 228 is offset from the beginning of the information packet 220.

Figure 23:
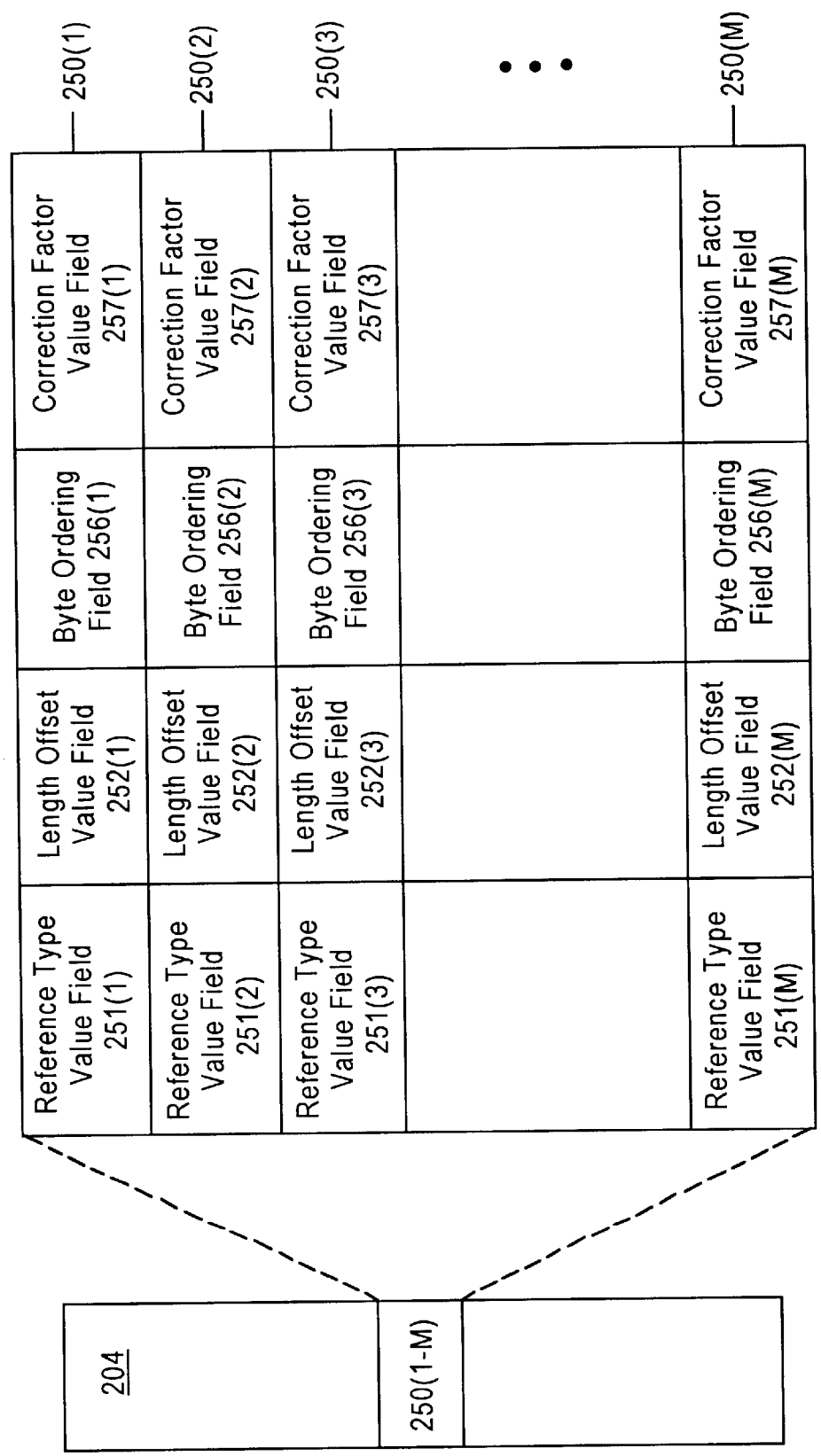
FIG. 23 shows a set of length-type data storage elements in an alternate embodiment of the present invention.

In an alternate embodiment of the present invention, as shown in FIG. 23, each length-type data storage element 250 also includes a byte ordering field 256 and a correction factor value field 257. Each byte ordering field 256(1)–256 (M) contains an indication of whether an information packet having the respective protocol type 251(1)–251(M) employs big-endian or little-endian byte ordering in a protocol length field of the packet. Each correction factor value field 257 (1)–257(M) contains a correction factor value. This value indicates the number of bytes that should be added to the value in the protocol length field 228 (FIG. 5) of an information packet 220 to ascertain the number of bytes in the entire information packet 220. Accordingly, the correction factor value may be retrieved and employed in place of the sum of "HEADER+FCS" in equations 7 and 12 above.

The values in a correction factor value field 257(1)–257 (M) and byte ordering field 256(1)–256(M) are to be used when the information packet has a length-type value that matches the reference type value in a respective reference type value field 251(1)–251(M). For example, the values in a first byte ordering field 256(1) and first correction factor value field 257(1) are used when an information packet has a value in its length-type field that matches the reference type value in the first reference type value field 251(1). The byte ordering field 256 and the correction factor value field 257 are both accessed by the host processor unit 207 in the same manner as the reference type value field 251 and length offset value field 252.

In the table search state 263, the reference type value in one of the length-type data storage elements 250 is retrieved by the length finder circuit 213. The retrieved reference type value is then compared to the length-type value for the incoming information packet 220. If the reference type value does not match the length-type value, the length finder circuit 213 transitions to the last register state 266. Here, the length finder circuit determines whether any of the length-type data storage elements 250 have not been examined by the length finder circuit 213. If all M number of the length-type data storage elements 250 have been examined, the length finder circuit 213 transitions to a default length set state 268. In the default length set state 268, a predetermined value is loaded into the data storage element for the length value, and the reception indicator circuit 211 is signaled that the length value is available to be retrieved. In one embodiment of the present invention, the predetermined value is the maximum allowable data field value. In an alternate embodiment, the predetermined value is the minimum allowable data field value.

If it is determined in state 266 that any of the length-type data storage elements 250 remain unexamined, a pointer increment state 267 is entered. Here, the length finder circuit 213 is pointed to an unexamined length-type data storage element 250. The length finder circuit 213 then transitions to state 263, where the length finder circuit 213 compares the reference type value of the new length-type data storage element 250 with the length-type value.

If the length finder circuit detects a match between a reference type value and the length-type value in state 263, it transitions to a protocol length retrieval state 264. In state 264, the length finder circuit 213 retrieves the length offset value from the one of the length-type data storage elements 250(1)–250(M) that contains the reference type value matching the length-type value. Next, the length finder circuit 213 retrieves the value in the protocol length field 228 of the incoming information packet 220 to obtain a protocol length value. The length finder then enters a second length set state 265.

In the second length set state 265, the length finder circuit 213 uses the protocol length value to determine the number of bytes in the data field 225 of the incoming information packet 220. This number is then loaded into the data storage element for the length value. In the second length set state 265 in one embodiment of the present invention, the returned protocol length value indicates the number of bytes in the data field of the incoming information packet 220. Accordingly, the length finder circuit 213 loads the protocol length value into the data storage element for the length value. Finally, the length finder circuit 213 signals the reception indicator circuit 211 that the length value is available to be retrieved.

In accordance with the present invention, the length finder circuit 213 may retrieve a byte ordering value. The byte ordering value is retrieved from the byte ordering field 256 of one of the length-type data storage elements 250(1)–250

(M). The one of the length type data storage elements is the one that also contains the reference type value that matches the length-type value of the incoming information packet 220. The length finder circuit 213 then uses this byte ordering value to determine the byte order in the protocol length field 228 of the incoming information packet 220 and interpret the protocol length value accordingly.

By employing the table of programmable length-type data storage elements 250(1)–250(M), embodiments of the present invention enable a host system's user to specify multiple protocols that will be supported by the reception indicator circuit 211.

Although the invention has been described above with particularity, this was merely to teach one of ordinary skill in the art how to make and use the invention. Many modifications will fall within the scope of the invention, as that scope is defined by the following claims.

What is claimed is:

1. A reception indicator circuit for use in an apparatus, wherein the apparatus enables a host system to receive information packets from a medium, said reception indicator circuit comprising:

a delay calculator configured to, select and read a reference delay value in one of N number of length-delay data storage elements, wherein a reference length value contained in the one of N number of length-delay data storage elements corresponds to a length value of an information packet (PACKET_SIZE) being received by the apparatus, and calculate an interrupt time for an information packet being received by the apparatus;

wherein said delay calculator calculates the interrupt time by performing the following operation:

$$t_{SEG1} = A * PACKET\_SIZE - B$$

wherein:
$t_{SEG1}$ is the interrupt time;
A is an interrupt time coefficient,
B is an interrupt time constant, and
PACKET_SIZE is a number of bytes in a portion of the information packet;

a delay comparator for detecting when the interrupt time has elapsed from an instance at which the apparatus began receiving a specified byte of the information packet; and a signal asserter for asserting a reception signal when said delay comparator detects that the interrupt time has elapsed.

2. A reception indicator circuit as called for in claim 1, wherein the interrupt time coefficient is equal to a difference between a time for the apparatus to receive a single byte of the information packet from the medium and a time to copy a single byte of information packet from the apparatus to the host system.

3. A reception indicator circuit as called for in claim 1, wherein the interrupt time constant is substantially equal to a sum of an interrupt latency time of the host system and a setup time for an interrupt service routine for the apparatus.

4. A reception indicator circuit as called for in claim 1, wherein the reception signal is not asserted until after a minimum value number of bytes in the information packet have been received by the apparatus.

5. A reception indicator circuit as called for in claim 1, wherein the apparatus, including the reception indicator circuit, is formed on an integrated circuit.

6. A reception indicator circuit as called for in claim 1, wherein the specified byte of the information packet is a first byte of the information packet.

7. A reception indicator circuit as called for in claim 6, wherein the portion of the information packet includes all bytes in the information packet.

8. A reception indicator circuit as called for in claim 1, wherein the apparatus is a network peripheral and the medium is a communications network.

9. A method for providing a reception signal to indicate that an information packet is being received by a network peripheral coupled to a host system, said method comprising the steps of:

(a) selecting and reading a reference delay value in one of N number of length-delay data storage elements, wherein a reference length value contained in the one of N number of length-delay data storage elements corresponds to a length value of an information packet (PACKET_SIZE) being received by the peripheral, (b) calculating an interrupt time by performing the following operation:

$$t_{SEG1} = A * PACKET\_SIZE - B$$

wherein:
$t_{SEG1}$ is the interrupt time;
A is an interrupt time coefficient,
B is an interrupt time constant, and
PACKET_SIZE is a number of bytes in a portion of the information packet and is dependent upon the length value, (c) detecting when the interrupt time has elapsed from an instance at which the peripheral began receiving a specified byte of the information packet; and (d) asserting a reception signal when said delay comparator detects that the interrupt time has elapsed.

10. A method as called for in claim 9 further including:

(c) detecting when the interrupt time has elapsed from an instance at which the network peripheral began receiving a specified byte of the information packet; and (d) asserting the reception indication signal when the interrupt time has elapsed.

11. A method as called for in claim 9, wherein the interrupt time coefficient is equal to a difference between a time for the network peripheral to receive a single byte of the information packet from a communications network and a time to copy a single byte of the information packet from the network peripheral to the host system.

12. A method as called for in claim 9, wherein the interrupt time constant is substantially equal to a sum of an interrupt latency time of the host system and a setup time for an interrupt service routine for the network peripheral.

13. A method as called for in claim 10, wherein the reception signal is not asserted until a minimum value number of bytes of the information packet have been received by the network peripheral.

14. A method as called for in claim 10, wherein the specified byte of the information packet is a first byte of the information packet.

15. A method as called for in claim 14, wherein the portion of the information packet is all bytes in the information packet.

* * * * *